(12) United States Patent
Flaherty et al.

(10) Patent No.: US 7,134,372 B2
(45) Date of Patent: Nov. 14, 2006

(54) CNC SLITTER MACHINE

(75) Inventors: Patrick M. Flaherty, Kettering, OH (US); Rick L. Ahrns, New Bremen, OH (US); Charles G. Rutschilling, St. Henry, OH (US)

(73) Assignee: Blue IP, Inc., Callery, PA (US)

( * ) Notice: Subject to any disclaimer, the term of this patent is extended or adjusted under 35 U.S.C. 154(b) by 282 days.

(21) Appl. No.: 10/008,936

(22) Filed: Nov. 8, 2001

(65) Prior Publication Data

US 2003/0205117 A1 Nov. 6, 2003

(51) Int. Cl.
*B26D 1/14* (2006.01)

(52) U.S. Cl. .................. 83/425.4; 83/499; 83/504; 83/508.3; 493/367; 225/3

(58) Field of Classification Search .............. 83/13, 83/71, 479, 482, 499, 498, 504, 508.3, 505, 83/495, 508.1, 508.2, 954, 560, 425.3, 425.4; 464/157; 483/60, 58; 225/3; 493/367, 365
See application file for complete search history.

(56) References Cited

U.S. PATENT DOCUMENTS

| | | | |
|---|---|---|---|
| 3,003,403 A | | 10/1961 | Goettsch |
| 3,570,335 A | | 3/1971 | Marin |
| 3,886,833 A | * | 6/1975 | Gunn et al. .......... 83/499 |
| 4,102,227 A | * | 7/1978 | Simko .......... 83/881 |
| 4,201,352 A | | 5/1980 | Madachy |
| 4,224,847 A | | 9/1980 | Tokuno |
| 4,226,150 A | | 10/1980 | Reed |
| 4,252,044 A | * | 2/1981 | Yamashita et al. ........ 83/499 |
| 4,254,677 A | | 3/1981 | Evans |
| 4,316,317 A | * | 2/1982 | Ritzling ........ 29/468 |
| 4,346,635 A | | 8/1982 | Krauss et al. |
| 4,548,109 A | * | 10/1985 | Tokuno et al. ........ 83/76.7 |
| 4,580,086 A | * | 4/1986 | Tokuno et al. ........ 318/603 |

(Continued)

FOREIGN PATENT DOCUMENTS

| | | |
|---|---|---|
| DE | 27 14 325 A1 | 10/1978 |
| DE | 28 44 569 A | 4/1979 |
| DE | 2844569 | 4/1979 |
| DE | 38 11 953 A1 | 11/1988 |
| DE | 44 46 267 A1 | 6/1996 |

OTHER PUBLICATIONS

Heinrich Georg GmbH–Maschinenfabrik, *Our Production Programme*, Kreuztal (3 pages).
Source Unknown, 4 Pictures (1 page).
Josef Frohling GmbH, *Slitting Line*, Brochure, Rolling Mill Plant Manufacturers, Olpe, Biggesee (1 page).
FIMI News, *Multiblades CNC Slitting Shear*, Vigano Brianza (Como), Italy (2 pages).

*Primary Examiner*—Allan N. Shoap
*Assistant Examiner*—Phong Nguyen
(74) *Attorney, Agent, or Firm*—Kirkpatrick & Lockhart Nicholson Graham LLP

(57) ABSTRACT

A machine for slitting a metal sheet has a number of knife holder assemblies each containing a rotary knife. The knife holder assemblies are mounted for movement along upper and lower rotating shafts which rotate the knives during a slitting operation. The position of the knife holder assemblies is programmably controlled for efficient and accurate positioning and adjustment of the knives along the rotating shafts for a variety of slitting configurations. Additionally, each of the upper and lower drive shafts contains a pair of drive shaft sections that are normally connected together during operation and can be disconnected for servicing of the knife holder assemblies on the shafts. The slitting machine includes upper and lower frames that are movable relative to each other by adjustment of a pair of jack screws to slit metal sheets of differing thicknesses without labor intensive adjustment or reconfiguration of the machine.

26 Claims, 12 Drawing Sheets

U.S. PATENT DOCUMENTS

| | | | |
|---|---|---|---|
| 4,627,214 A | * 12/1986 | Anderson et al. | 53/71 |
| 4,684,360 A | 8/1987 | Tokuno et al. | |
| 4,887,502 A | 12/1989 | Voges | 83/479 |
| 4,934,234 A | * 6/1990 | Cavagna | 83/498 |
| 5,016,806 A | 5/1991 | Yapp et al. | |
| 5,036,741 A | 8/1991 | Scott | |
| 5,325,751 A | 7/1994 | Green et al. | |
| 5,637,068 A | * 6/1997 | Chambers | 483/1 |
| 5,735,734 A | 4/1998 | Hertelendi | |
| 5,761,980 A | * 6/1998 | Ima et al. | 83/500 |
| 5,888,268 A | * 3/1999 | Bando | 65/286 |
| 5,899,319 A | * 5/1999 | Jarnagin | 198/666 |
| 6,129,488 A | 10/2000 | Fahr | |
| 6,176,163 B1 | 1/2001 | Kramer | |

* cited by examiner

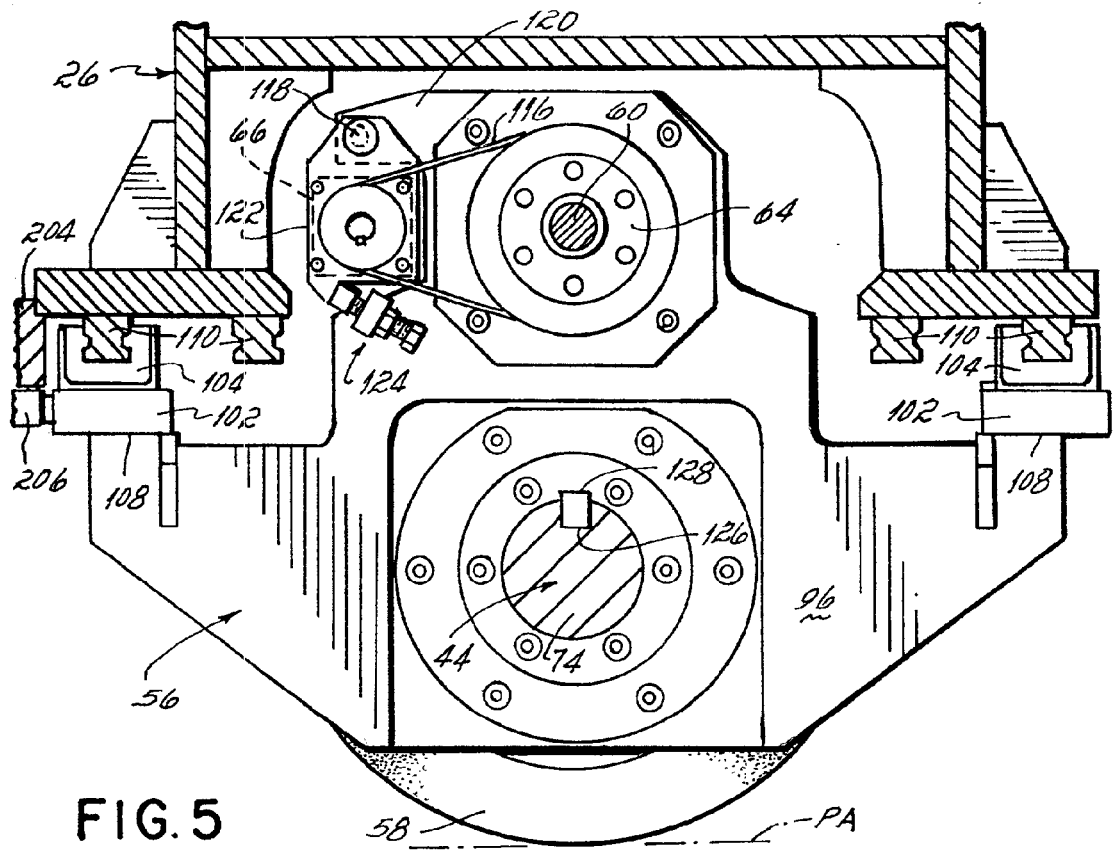
FIG. 5
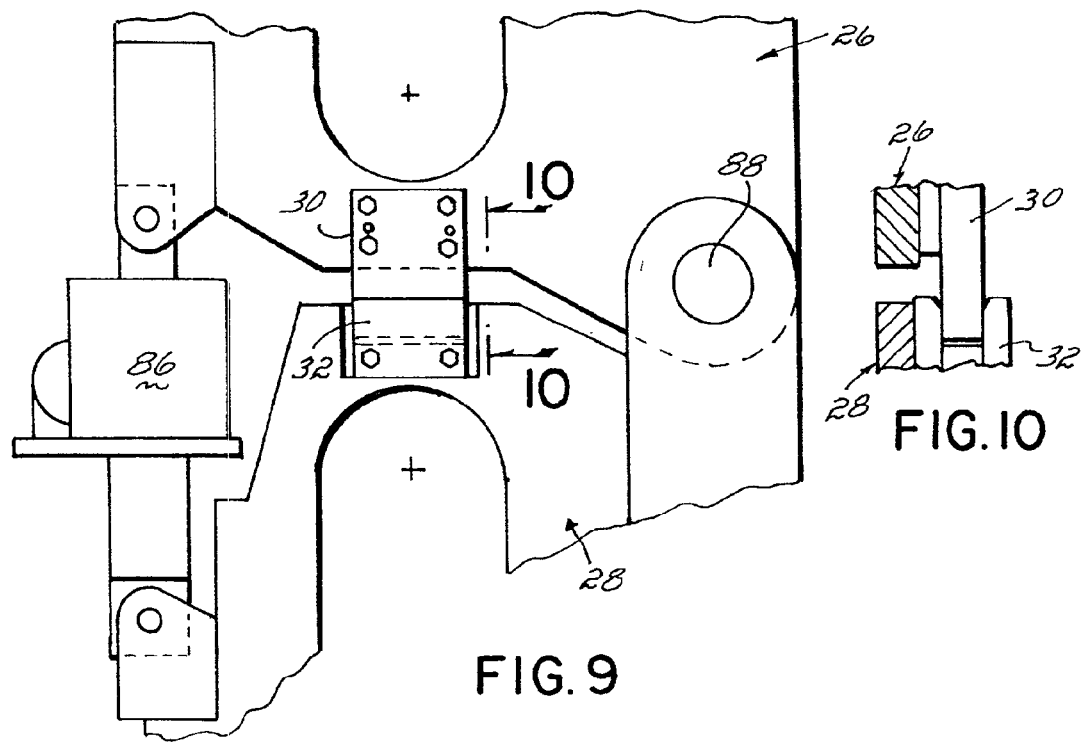
FIG. 9
FIG. 10

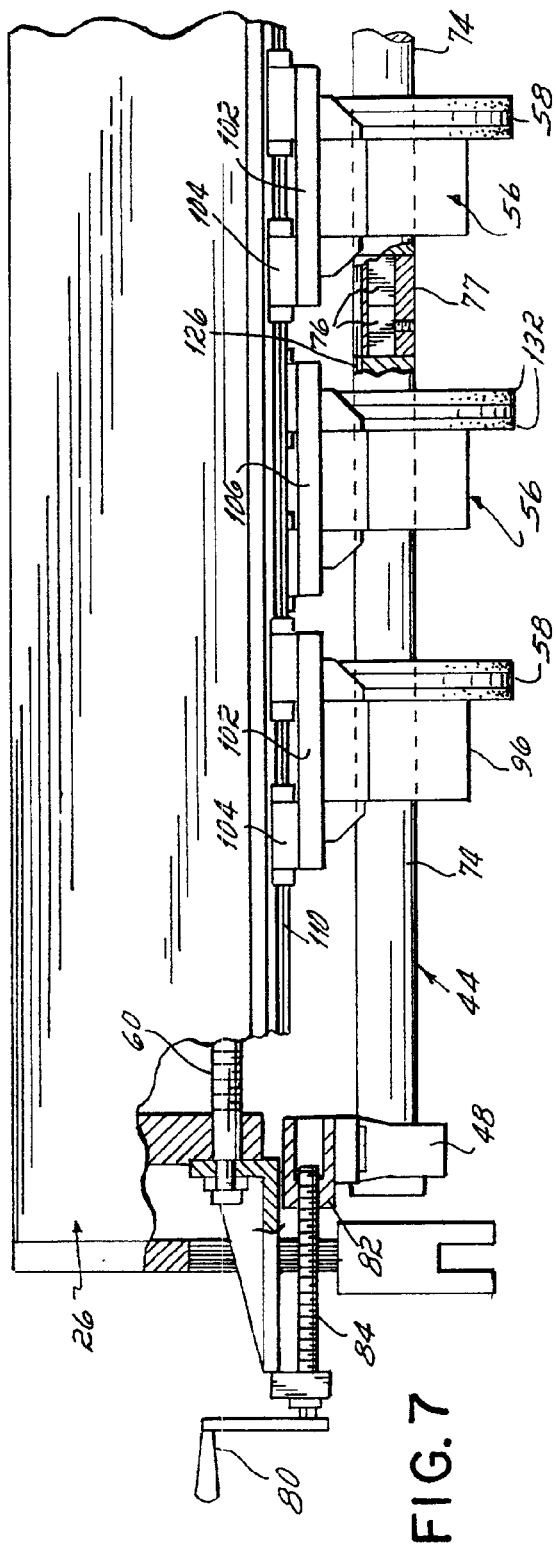
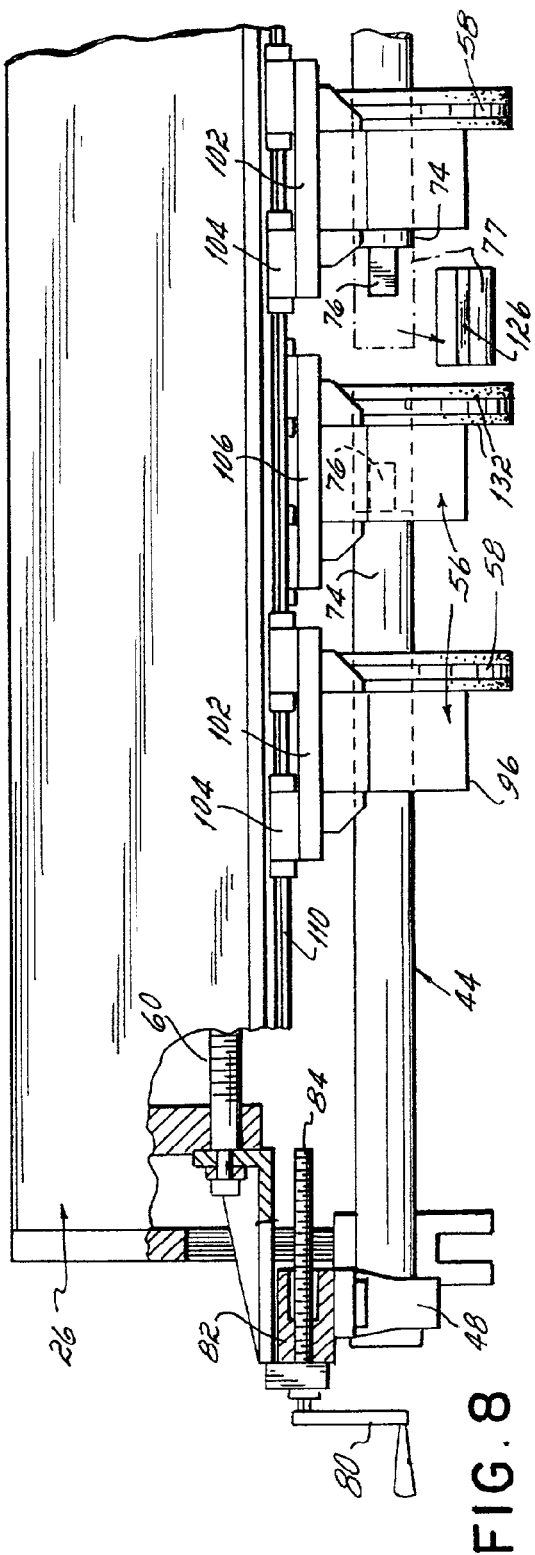
FIG. 7
FIG. 8

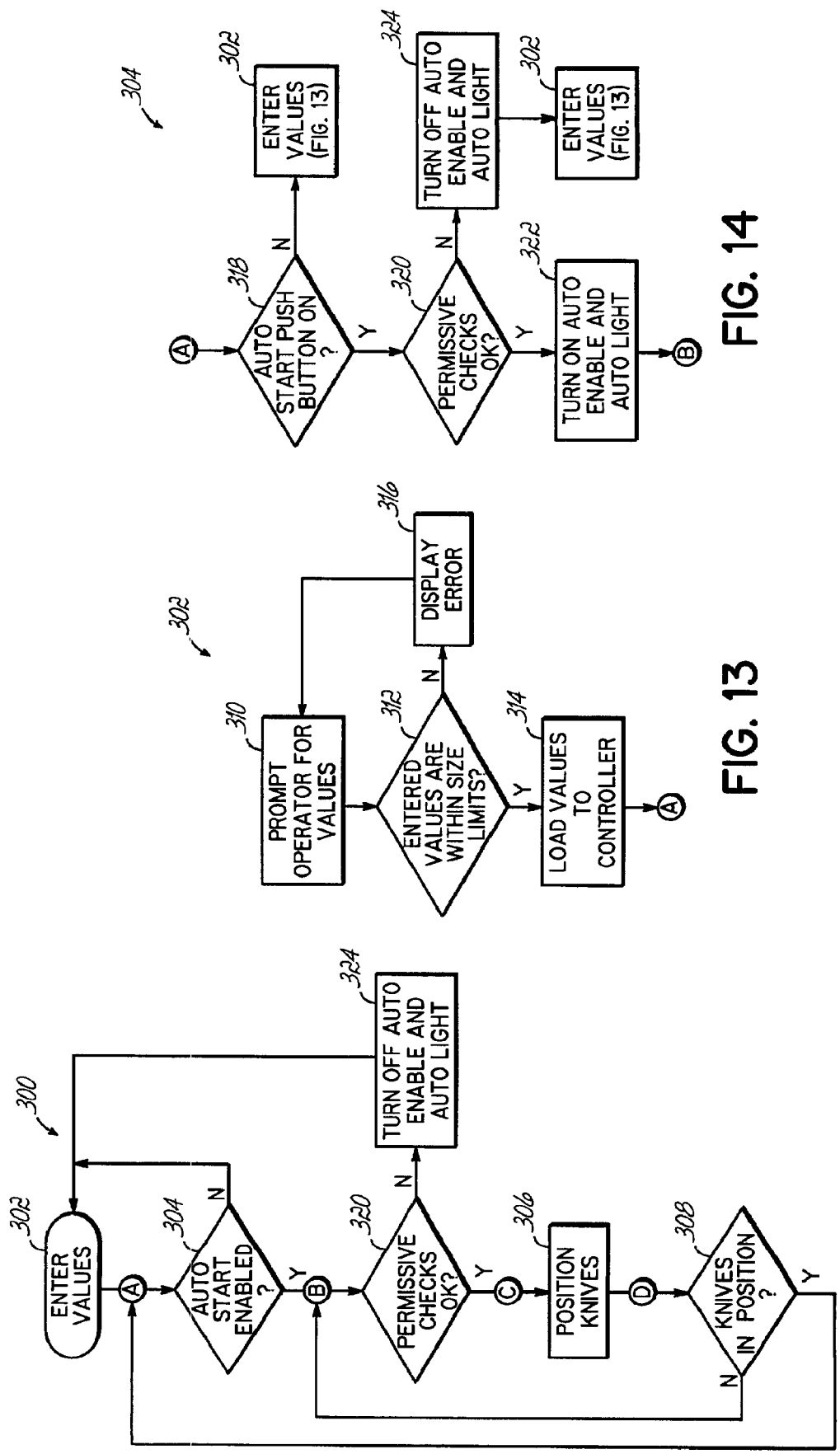

CNC SLITTER MACHINE

FIELD OF THE INVENTION

The present invention relates generally to slitter machines for slitting sheet metal into "mults" or strips and, more particularly, to slitter machines having adjustable knives for varying the size and/or number of mults processed by the slitter machine.

BACKGROUND OF THE INVENTION

Much of the steel produced by mills is in the form of coiled steel sheet, but rarely does the sheet correspond in width to the multitude of products that are stamped or otherwise formed from it. Accordingly, the steel sheet is usually slit longitudinally to sizes suitable for the particular products. Indeed, special slitting machines are made for this purpose.

The typical slitting machine has circular blades or knives arranged in pairs on two powered shafts or arbors, there being one knife of each pair on one of the arbors and the second knife of the pair on the other arbor. The arbors are connected to a drive system for counter-rotation. During operation, sheet metal is moved between the arbors and cut into mults by the knives counter-rotating on the arbors. Actually each knife is nothing more than a hardened steel disk having flat end faces and a cylindrical peripheral face which intersects the end faces at relatively sharp cutting or shearing edges. The disks of each pair are positioned on their respective arbors, often with a slight overlap. Overlap or not, the knives of each pair are positioned close enough to each other to enable them to cut or shear the metal sheet as it passes between those knives. In other words, the metal sheet is drawn between the two knives of a pair the disk-like knives shear the sheet along the opposite cutting edges, thus producing a clean longitudinal cut in the sheet. Not only are the disk-like knives arranged in pairs, but the pairs of knives are also usually organized into left and right hand configurations to prevent the longitudinal segments of the slit sheet from acquiring a twist or spiral upon emerging from the slitting machine.

The size of the mults is determined by the spacing of the knives on the arbors. The knives, while being fixed firmly on their respective arbors during the operation of the machine, nevertheless may be removed for sharpening or may be repositioned so that the width of the segments slit may be varied. Setting the knives on the arbors of a slitting machine however is a tedious and time-consuming procedure, requiring a high degree of skill, for the knives must be located with considerable precision, not only to acquire the proper width for the cut, but to also maintain a clean high quality cut as well.

In one type of slitting machine, the knives are carried on hubs that slide over the arbor and are secured with set screws in the desired positions. To set the knives of a pair in the proper position, the location of the cut desired from the pair of knives is usually located by measuring with a tape measure from reference point on the machine. One of the knives is then moved over its arbor to the point located with the tape measure and the set screw of its hub is turned down to secure the knife. Once the knife is so positioned, an indicator gage should be brought against it while the arbor is turned slowly. With the indicator gage the knife is checked for wobble and usually adjustments must be made by loosening the set screws and tapping the knife lightly to eliminate the wobble. The same procedure is then repeated with the other knife of the pair, only its location is determined from the location of the previous knife, there usually being an axial gap on the order of 7 to 10 percent of the thickness of the metal sheet between the opposite cutting edges of the two knives. To change the size and number of mults produced from the sheet metal, the hubs must be released from the arbors and moved to new locations. New hubs would be added, or existing hubs removed, as dictated by changes in the number of mults to be cut in the sheet metal.

In another type of slitting machine, spacers separate the knives. These spacers are large enough and are machined with enough precision to minimize the wobble inherent with conventional arbors, but present complexities in the selection of spacers and shims to properly locate the knives. The selection of spacers and shims requires a considerable amount of skill. Furthermore, the spacers must be handled carefully, to avoid nicks that will skew the knives and create a wobble as they rotate.

To change the size and number of mults produced from the sheet metal, the spacers must be removed from the arbor and replaced with a new set of spacers adapted to the new cutting pattern.

In the past, such replacements and adjustments were generally performed by hand. This use of manual labor was expensive and slowed the process of conversion from one cutting job to the next. The task of replacement and adjustment was difficult physically, often requiring workers to lift the heavy hubs or spacers to uncomfortable heights. Furthermore, where spacers were used, it was necessary to maintain a sizable inventory of such spacers to provide flexibility in cutting different sizes and numbers of mults.

One prior attempt to solve such problems is disclosed in U.S. Pat. No. 4,887,502 directed to a machine for slitting metal. The machine includes upper and lower powered arbors and also upper and lower storage arbors which align respectively with the upper and lower powered arbors. Each powered arbor supports and turns several knives which are mounted on hubs along those arbors, and these knives when not needed may be moved, along with their hubs, onto the aligned storage arbors. Each knife is captured in a carriage which moves along one of the beams. The knives are positioned through a lead screw which drives a carriage having stops against which knives on the upper and lower arbors are manually moved and set in position through contact with the stops. The carriage may also be provided with fingers which actually capture the knives of a pair and move them to the correct position.

To eliminate the need to reconfigure a slitting machine for a particular slitting operation, a slitting line may include multiple slitters having different knife configurations that can be moved into and out of the line.

There remains a need in the art for slitting machines which can be automatically set up and adjusted, including the replacement or servicing of knives on the arbors, with minimal labor on the part of the operator or user.

SUMMARY OF THE INVENTION

The present invention overcomes the foregoing and other shortcomings and drawbacks of slitting systems and methods of slitting heretofore known. While the invention will be described in connection with certain embodiments, it will be understood that the invention is not limited to these embodiments. On the contrary, the invention includes all alternatives, modifications and equivalents as may be included within the spirit and scope of the present invention.

These and other needs are addressed by a CNC slitting machine having an upper and a lower frame, an upper and a lower rotating shaft, and pairs of knife holder assemblies supported for movement along the respective shafts. Each knife holder assembly supports an arbor for mounting a knife. Preferably, the rotating upper and lower shafts are mounted respectively in the upper and lower frames. A drive motor is operably coupled to the shaft assemblies for rotation.

The slitting machine of one presently preferred embodiment includes a knife holder position adjustment system that is operably coupled to each of the knife holder assemblies for movement of the assemblies along the respective drive shafts. The machine advantageously includes a programmable logic controller that is electrically coupled to the knife holder position adjustment system associated with each knife holder assembly. The programmable logic controller, in combination with the knife holder position system associated with each knife holder assembly, positions the knife holder assemblies along the shafts and secures the knife holder assemblies in place for rotation of the knives with the shafts. A presently preferred machine is capable of cutting from one-to-five mults. To change jobs, the operator stands at an operating station and enters the number of desired mults, the desired individual mult widths, the material thickness, the desired percentage of horizontal gap between cooperating upper and lower knives, the desired relative vertical knife position, and the desired offset distance from centerline into a human-to-machine (HMI) interface coupled to the programmable logic controller. The slitting machine itself then sets up the machine automatically.

The programmable logic controller is preferably part of a closed-loop feedback control system which receives one or more signals from sensors monitoring the position or movement of the knives and which reacts to the sensed position or movement of the knives to properly position the knives on the shafts.

In alternative preferred embodiments of the slitting machine, the drive shaft assemblies each include a number of drive shaft sections releasably coupled to one another for rotation in the machine frame. In one embodiment, each drive shaft assembly includes a pair of drive shaft sections that are releasably coupled to each other to form a single elongated drive shaft assembly. The pair of adjacent drive shaft sections of each drive shaft are selectively uncoupled from one another for servicing the machine, such as repair or replacement of a knife in the knife holder positioned proximate the juncture between the drive shaft sections. In one presently preferred embodiment, each drive shaft section includes a spindle that projects axially from the section and a coupling releasably connects the spindles on the pair of adjacent drive shaft sections. A screw is connected to at least one of the drive shaft sections so that rotation of the screw axially withdraws the connected drive shaft section from the adjacent shaft section to thereby provide access to the knife holder assembly and associated knife proximate the juncture between the pair of drive shaft sections.

In another preferred embodiment of a slitting machine according to this invention, the upper and lower frames of the machine are pivotally coupled together. The upper frame is movable relative to the lower frame to adjust the relative vertical positioning of the knives supported in the upper and lower knife assemblies for slitting metal sheets of differing thicknesses. A frame adjustment mechanism in the form of a pair of jack screws is mounted between the upper and lower frames and an actuator coupled to each of the jack screws simultaneously adjusts the jack screws and moves the upper frame in a direction generally perpendicular to the drive shafts relative to the lower frame. Preferably, the upper frame remains generally parallel relative to the lower frame during movement.

As a result of the various embodiments of this invention, a slitting machine is easily and efficiently set up and reconfigured by an operator through the HMI interface, programmable logic controller and knife holder position adjustment system for slitting mults of various sizes without significant machine downtime and labor-intensive procedures. Furthermore, the machine is readily adjustable for slitting metal sheets of differing thicknesses by conveniently adjusting the upper frame relative to the lower frame. Moreover, in one embodiment of the machine, each of the drive shaft assemblies is split or segmented into sections which can be uncoupled from one another for convenient servicing and/or replacement of the knife and knife holder assemblies.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

The objectives and features of the invention will become more readily apparent from the following detailed description taken in conjunction with the accompanying drawings in which:

FIG. 5 is a cross-sectional view taken along line 5—5 of FIG. 4 of a knife holder assembly according to a presently preferred embodiment of this invention on the slitting machine;

FIGS. 7–8 are side elevational views partially broken away of a portion of the upper drive shaft assembly in coupled and uncoupled configurations, respectively;

FIG. 9 is a view seen on line 9—9 of FIG. 2;

FIG. 10 is a cross-sectional view taken along line 10—10 of FIG. 9;

FIGS. 12–19 are software flow diagrams of various routines performed by the control system of the present invention to control the position of the knife holder assemblies on the slitting machine.

DETAILED DESCRIPTION OF THE PREFERRED EMBODIMENT

Figure 1:
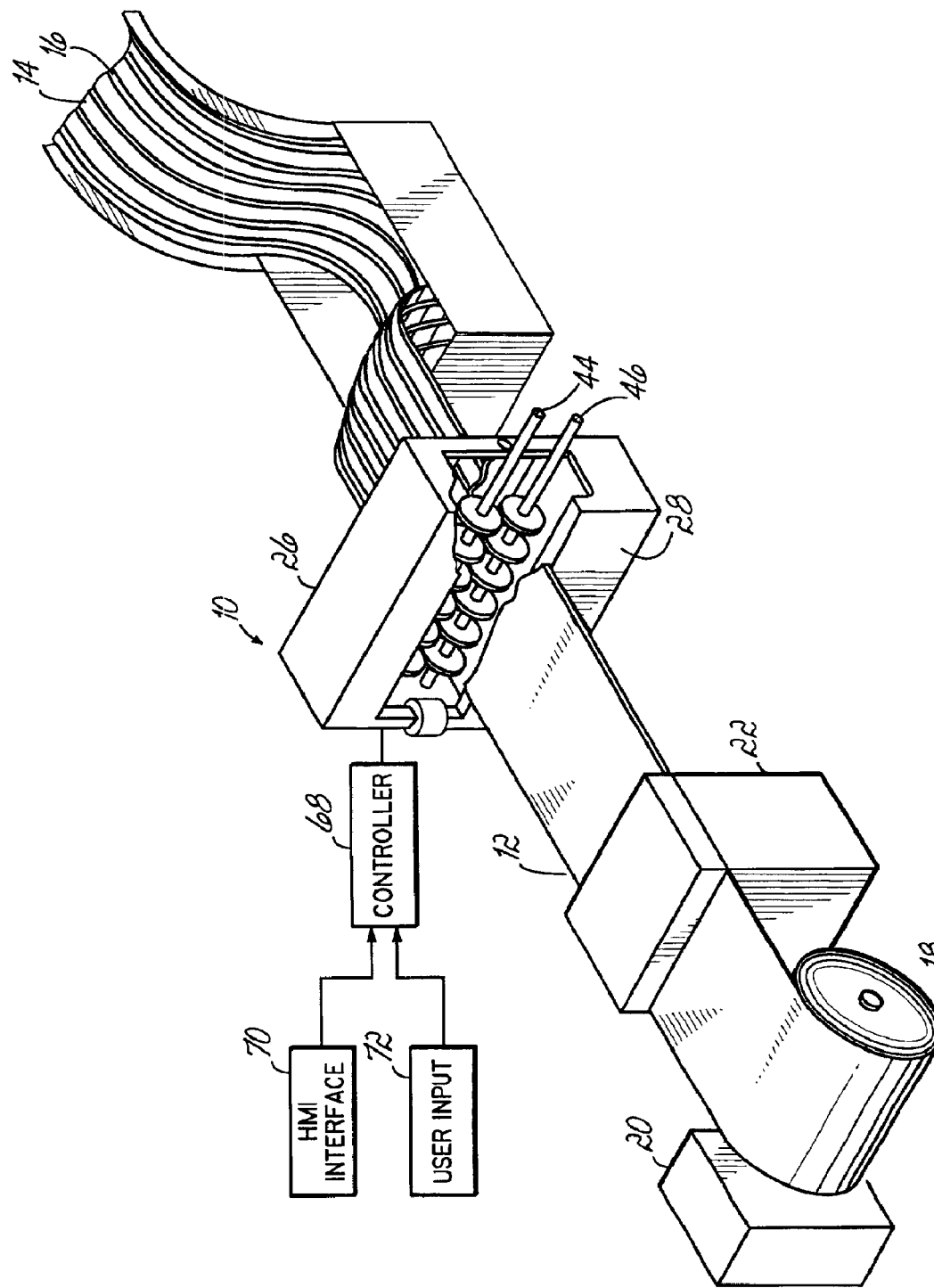
FIG. 1 is a perspective view of a slitting machine according to a presently preferred embodiment with the metal sheet being slit and other components used in conjunction with the machine.

Referring to FIG. 1, a slitting machine 10 according to a presently preferred embodiment of this invention is used for shearing metal sheet 12, such as sheet steel, into multiple segments or mults 14 of a desired width along slits 16. The metal sheet 12 is normally provided from a mill or other supplier of mill products in a coil 18. The coil 18 is supported on a spool 20. The metal sheet 12 is withdrawn from the coil 18 and fed into the machine 10. Typically, the metal sheet 12 passes through a straightening machine 22 to remove the coil set. The sheet 12 alternatively may be fed into the machine 10 in individual sections, preferably with the assistance of a skewed roller table (not shown) or the like.

Figure 2:
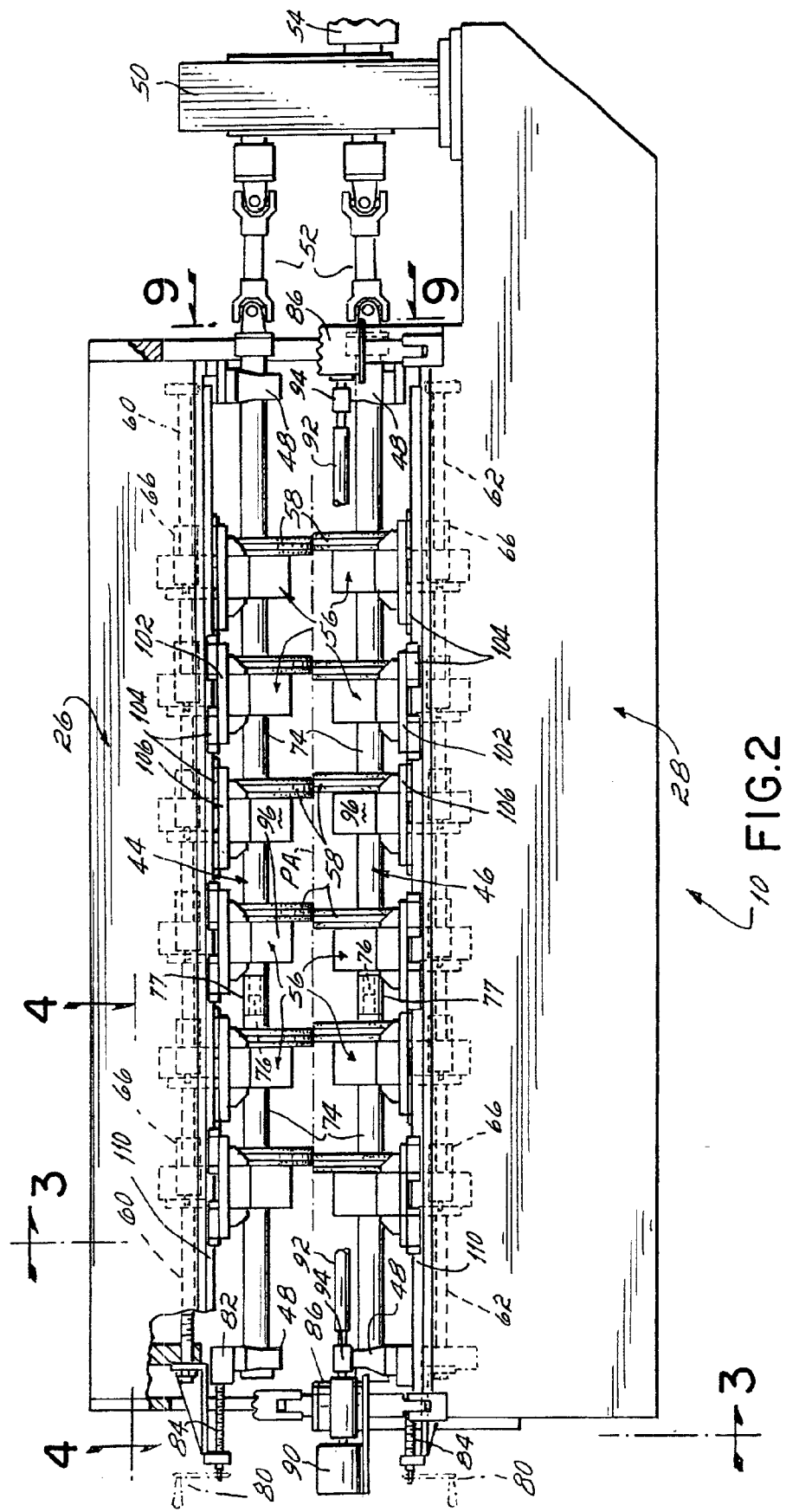
FIG. 2 is a side elevational view of the slitting machine according to this invention.

Referring to FIGS. 1 and 2, a presently preferred embodiment of the slitting machine 10 includes an upper frame 26 movably coupled at spaced ends thereof to a lower frame 28. The upper and lower frames 26, 28 of the machine 10 include upper and lower drive shaft assemblies 44, 46, respectively, mounted therein for rotation. The drive shaft assemblies 44, 46 are supported in the respective frames 26, 28 by spaced pillow block bearings 48. Corresponding ends of the upper and lower drive shaft assemblies 44, 46 are coupled to a gear box 50 by separate universal couplings 52. A motor 54 is connected to the gear box 50 to provide rotational movement through the gear box 50 to the universal couplings 52 and ultimately the drive shaft assemblies 44, 46. The drive shaft assemblies 44, 46 are rotated in opposite counter-rotating directions for pulling and slitting the metal sheet 12 passing therebetween.

Figure 3:
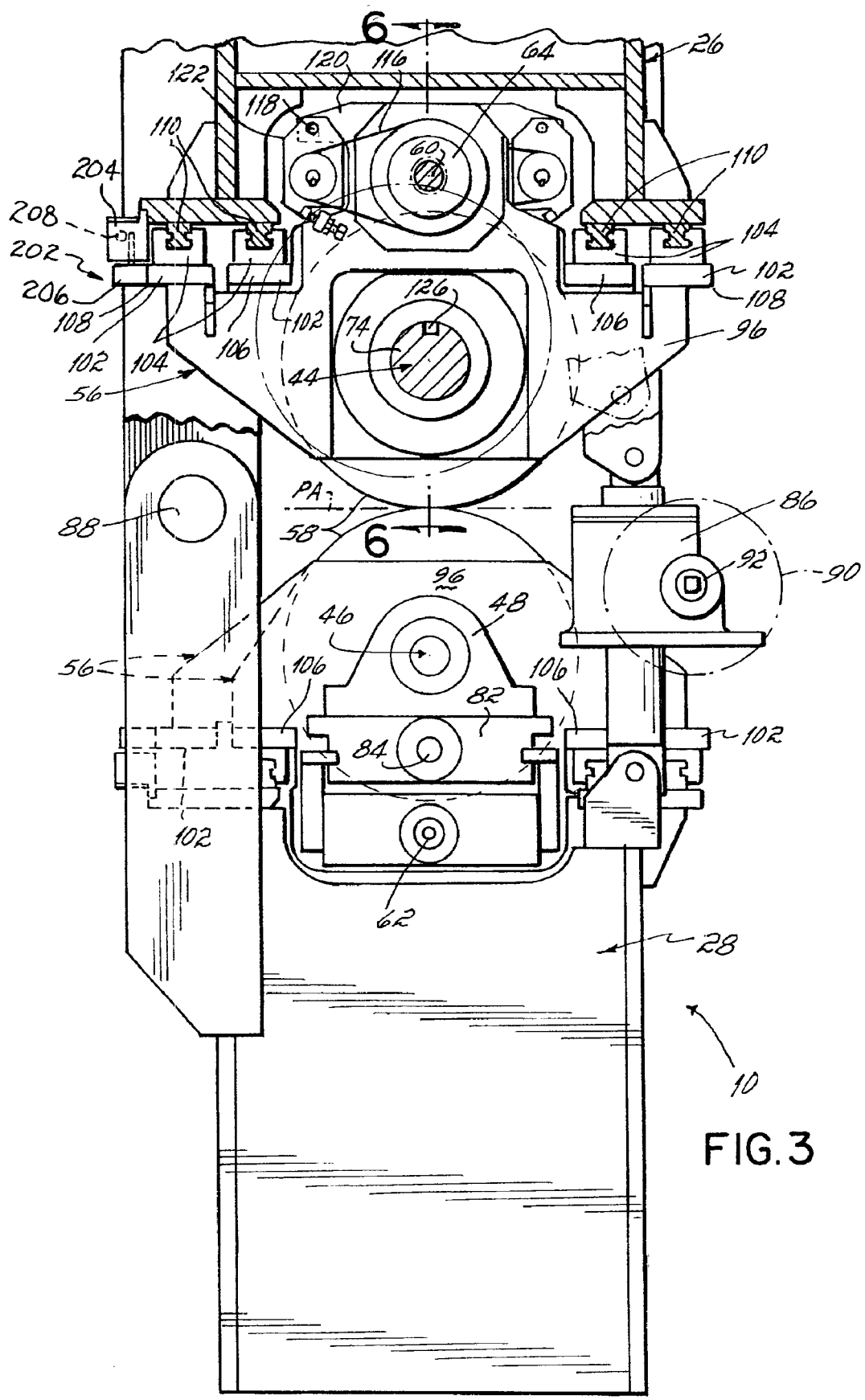
FIG. 3 is a cross-sectional view taken generally along line 3—3 of the slitting machine of FIG. 2 showing a pair of knife holder assemblies on the upper and lower drive shaft assemblies, respectively.
Figure 4:
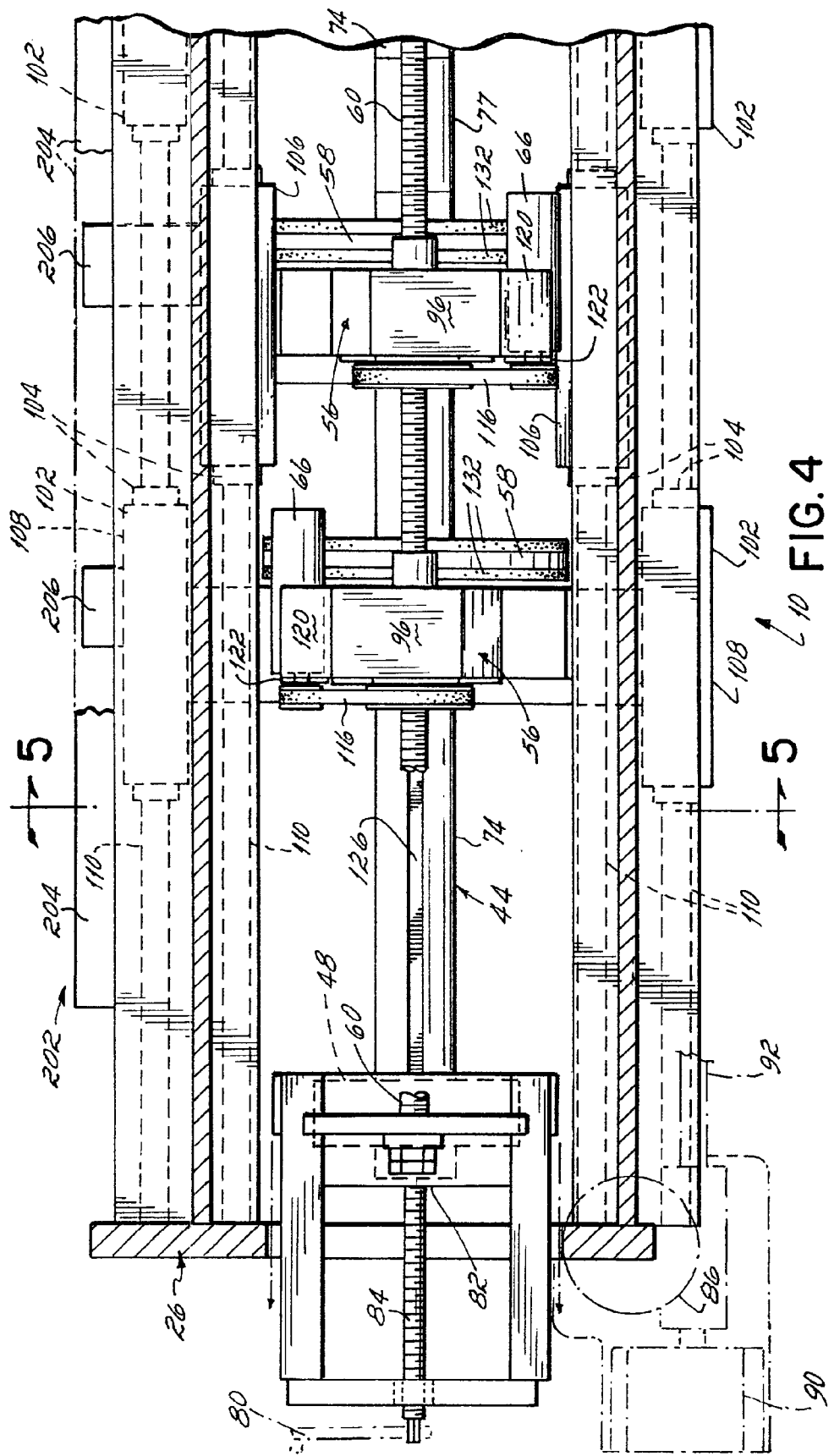
FIG. 4 is a cross-sectional top view taken along line 4—4 of FIG. 2 of the slitting machine.

A number of knife holder assemblies 56 are supported for movement along the upper and lower drive shaft assemblies 44, 46 as shown in FIGS. 2 and 3. The knife holder assemblies 56 are supported in cooperating pairs at spaced positions along the upper and lower drive shaft assemblies 44, 46 in the upper and lower frames 26, 28, respectively. The metal sheet 12 to be slit passes between the knife holder assemblies 56 on the upper shaft 44 and the knife holder assemblies 56 on the lower shaft 46 along a pass line PA as indicated in FIG. 2. Each upper knife holder assembly 56 includes a rotary knife 58 which cooperates with the rotary knife 58 in the corresponding lower knife holder assembly 56 of each cooperating pair to cut, shear or otherwise slit the metal sheet 12. A total of twelve knife holder assemblies 56 (six pair) are shown in FIG. 1 for producing five strips or mults 14. Although, it should be readily understood that the exact number of knife holder assemblies 56 is dependent upon the desired width and configuration of the mults 14 and the metal sheet 12 being slit.

Figure 6:
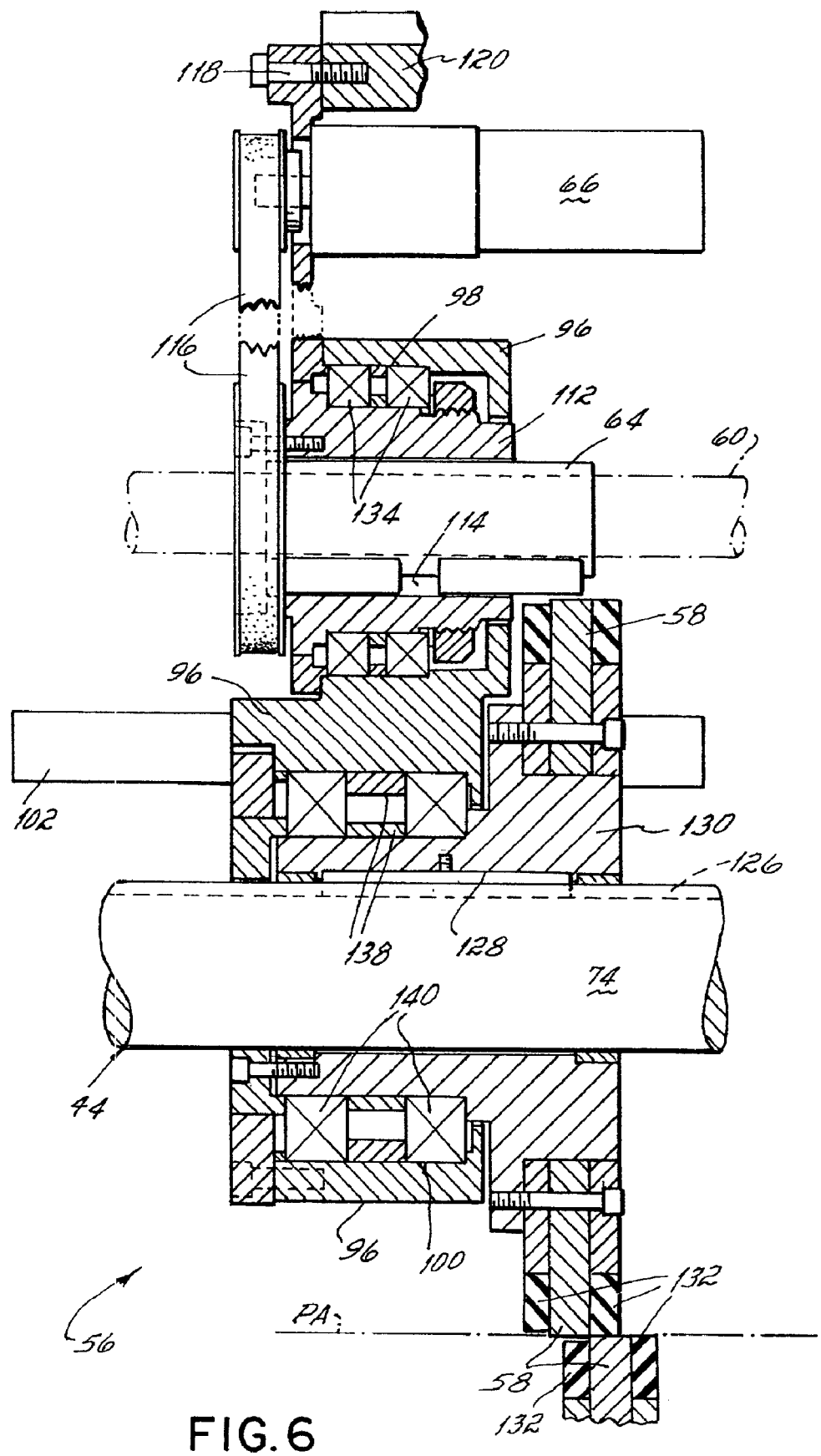
FIG. 6 is a cross-sectional view taken along line 6—6 of FIG. 3 of the knife holder assembly on the slitting machine.

Each of the knife holder assemblies 56 is not only supported for movement along the respective drive shaft assembly 44, 46, but is also operatively coupled to either a fixed upper threaded shaft 60 or a fixed lower threaded shaft 62. As shown in FIGS. 5 and 6, the respective fixed or stationary threaded shafts 60, 62 pass through a ball nut 64 in each of the knife holder assemblies 56. Each ball nut 64 is connected to a positioning motor 66 which is likewise electrically connected to a programmable logic controller 68 according to one aspect of this invention. The positioning motor 66 may be a servo motor, stepper motor, DC motor, AC vector motor, pneumatic motor, hydraulic motor, linear induction motor or any other type of drive motor. The programmable logic controller 68 is coupled to a human-to-machine (HMI) interface 70, such as a touch screen or the like (FIG. 1), that receives data inputs from a user. The controller 68 is also coupled to a user input 72 (FIG. 1), such as user actuatable buttons (not shown), so that the controller 68 receives these user inputs as well to control operation of the slitting machine 10. The threaded shafts 60, 62, ball nuts 64, positioning motors 66, programmable logic controller 68 and associated components contribute to form a knife holder position adjustment system that moves the individual knife holder assemblies 56 along the respective drive shaft assembly 44, 46 for proper, efficient and accurate positioning prior to slitting the metal sheet 12 as described in detail below.

In another aspect of the slitting machine 10 according to this invention, each drive shaft assembly 44, 46 includes a pair of drive shaft sections 74 as shown in FIGS. 2 and 7–8. The pair of drive shaft sections 74 for each drive shaft 44, 46 are adapted to be selectively uncoupled so that the pair of drive shaft sections 74 for each drive shaft 44, 46 can be separated. Each drive shaft section 74 preferably includes a spindle 76 projecting axially therefrom in opposition to the spindle 76 on the adjacent drive shaft section 74 of the respective pair. When the pair of sections 74 are coupled together, a tubular coupling 77 surrounds the spindles 76 to transfer the rotational movement of the drive shaft assembly 44, 46 along the length of the shafts.

To provide for convenient and efficient access to the knife blades 58 of the respective knife holder assemblies 56 for repair, replacement or servicing of the various components of the knife holder assemblies 56, the drive shaft sections 74 can be uncoupled through rotation of an actuator in the form of a handle 80 as shown in FIGS. 7 and 8. Specifically, a user rotates the handle 80 and thereby a collar 82 threaded onto a screw 84. The collar 82 is connected to the pillow block bearing 48 on the end of the drive shaft section 74 so that retraction of the collar 82 by rotation of the screw 84 likewise axially retracts the pillow block bearing 48 and connected drive shaft section 74 away from the adjacent drive shaft section 74 as shown in FIG. 8. Retraction of the drive shaft section 74 allows increased access for a technician to the knife holder assembly 56 and associated components for servicing, repair, replacement or the like.

The appropriate knife holder assembly 56 can be conveniently and efficiently moved into location proximate the juncture between the drive shaft sections 74 for appropriate servicing. Once the servicing is completed, reverse rotation of the handle 80 likewise advances the retracted drive shaft section 74 toward the adjacent drive shaft section 74 for subsequent recoupling with the coupling 77 and operation of the slitting machine 10. While one particular arrangement for coupling the drive shaft sections 74 together and movement thereof for uncoupling has been shown and described herein, it should be readily appreciated that alternative arrangements can be provided within the scope of this invention. For example, utilization of a servo motor or other automated process may be relied upon for movement of the drive shaft sections 74 relative to one another upon demand by a service technician. Likewise, various arrangements and schemes for coupling the drive shaft sections 74 together with or without a coupling 77 or the like may be utilized within the scope of this invention.

Referring to FIGS. 2–3, another feature of the slitting machine 10 according to presently preferred embodiments of this invention includes a pair of jack screws 86 positioned between spaced opposite ends of the upper and lower frames 26, 28 of the slitting machine 10. The jack screws 86 are positioned between the upper and lower frames 26, 28 proximate a front of the machine 10. The upper and lower frames 26, 28 are pivotally coupled together around a pivot shaft 88 proximate the back of the machine 10. The lower frame 28 is stationary while the upper frame 26 is capable of pivotal movement relative to the lower frame 28 about the pivot shaft 88. A pair of die springs (not shown) may be connected between the upper frame 26 and the lower frame 28 on respective opposite sides of the slitting machine 10 and close to the jack screws 86 to eliminate clearances between the upper and lower frames 26, 28 at their connection points. A jack screw motor 90 is mounted to provide a rotational input to one of the jack screws 86 and to a jack screw transfer shaft 92 that couples the two jack screws 86 together. Coupling sleeves 94 are mounted on each of the spaced ends of the transfer shaft 92 for joining the shaft 92 to the respective jack screw 86.

In operation, the jack screw motor 90 provides a rotational input to the adjacent jack screw 86 and to the opposite jack screw 86 through the transfer shaft 92. Jack screw motor 90 is electrically coupled to the programmable logic controller 68 and receives instructions from the controller 68 according to inputs entered by the operator through the HMI interface 70. Rotation of the motor 90 simultaneously raises or lowers the jack screws 86 for pivotally moving the upper frame 26 relative to the stationary lower frame 28 about the pivot shaft 88. As a result, the spacing between the upper and lower drive shaft assemblies 44, 46 is adjustable by rotation of the jack screw motor 90 that causes extension or retraction of the jack screws 86. The movement of the upper and lower frames 26, 28 and the associated drive shaft assemblies 44, 46 relative to each other controls the relative vertical positioning of the rotary knives 58 supported in knife holder assemblies 56 to accommodate metal sheet 12 of different thicknesses passing between the knife holder assemblies 56 for slitting. The jack screw motor 90 coupled to each of the jack screws 86 allows for more precise adjustment of both jack screws 86 and the movement of the entire upper drive shaft assembly 44 relative to the lower drive shaft assembly 46 is in a generally parallel orientation throughout the movement. As a result, the vertical spacing between the knife holder assemblies 56 on the upper drive shaft assembly 44 relative to the knife holder assemblies 56 on the lower drive shaft assembly 46 is consistent and does not vary dependent upon the lateral position of the respective knife holder assemblies 56. It will be appreciated that the jack screw motor 90 could be replaced with a hand wheel (not shown) or any other suitable device that is capable of moving the jack screws 86 as desired. Moreover, it will be appreciated that the jack screws 86 can be replaced with any other type of motor capable of moving the upper frame 26 relative to the lower frame 28 about the pivot shaft 88.

As shown in FIGS. 9 and 10, precise alignment of the upper frame 26 relative to the lower frame 28 is provided by an alignment block 30 fixed to the upper frame 28 being captured within a clevis 32 fixed to the lower frame 28. The tolerances of the alignment block 30 and clevis 32 are selected to assure proper registration of the upper and lower frames 26, 28 relative to each other. The engagement surfaces of the alignment block 30 and/or the clevis 32 may be hardened with a suitable material to reduce wear of the alignment components through repeated movement of the upper frame 26 relative to the fixed lower frame 28.

Referring now to FIGS. 2–6, a presently preferred embodiment of the knife holder assembly 56 according to this invention and the manner in which the position of the knife holder assemblies 56 is adjusted in the CNC slitting machine 10 will now be described. The knife holder assemblies 56 are supported in cooperating pairs along the upper and lower drive shaft assemblies 44, 46 such that one knife holder assembly 56 of each pair is positioned along the upper drive shaft assembly 44 and the complimentary knife holder assembly 56 of each pair is positioned along the lower drive shaft assembly 46. The knife holder assemblies 56 are generally identical with the exception of their orientation in the slitting machine 10; therefore, a knife holder assembly 56 positioned along the upper drive shaft assembly 44 will be described with respect to FIGS. 3–6. It should be readily understood that the same description applies to each of the other knife holder assemblies 56 positioned along the upper drive shaft assembly 44 as well as those positioned along the lower drive shaft assembly 46 in a reoriented position.

As shown in FIGS. 3, 5 and 6, each knife holder assembly 56 includes a retainer block 96 with an upper smaller hole 98 and a lower larger hole 100 passing between the front and back faces of the retainer block 96. The retainer block 96 also includes a pair of anchor flanges 102 (FIG. 5) spaced on the lateral sides of the retainer block 96 and positioned with an exposed face similarly oriented in the direction of the smaller hole 98. A pair of linear bearing blocks are mounted in spaced relationship to each of the anchor flanges 102 in either an inboard or outboard position 106, 108 (FIG. 3). Each linear bearing block 104 is sized and configured to capture one of the rails 110 (FIGS. 3 and 5) which extends lengthwise on the slitting machine 10 and which are provided in inner and outer rail pairs to support the knife holder assemblies 56. More specifically, a pair of upper inner rails 110, a pair of upper outer rails 110, a pair of inner lower rails 110 and a pair of outer lower rails 110 are provided on the machine 10 for supporting the respective knife holder assemblies 56.

Each knife holder assembly 56 is coupled through the linear bearing blocks 104 to each of the rails 110 in one of the inner or outer rail pairs. The inner and outer rails 110 on the upper and on the lower frame 26, 28 of the machine 10 advantageously allow for more intimate nesting of the adjacent knife holder assemblies 56 on the drive shaft assemblies 44, 46. A first knife holder assembly 56 is coupled through the linear bearing blocks 104 to each of the rails 110 on the inner pair of the respective upper or lower machine frames 26, 28. The knife holder assemblies 56 adjacent to the first are coupled through their respective linear bearing blocks 104 to the rails 110 of the outer pair to avoid interference with the first knife holder assembly 56 and allow for close pack nesting of the adjacent knife holder assemblies 56 and slitting of the metal sheet 12 for relatively narrow mults 14.

As shown in FIG. 6, one of the fixed or stationary threaded shafts 60, 62 in the respective machine frame 26, 28 projects through the smaller hole 98 of each retainer block 96. The ball nut 64 is inserted into a sleeve 112 positioned in the smaller hole 98 of each retainer block 96. The ball nut 64 is threadably coupled to the threaded shaft 60 or 62 and is fastened to the sleeve 112 so that the ball nut 64 and sleeve 112 are free to rotate relative to the fixed or stationary threaded shafts 60, 62. An opening 114 is provided in the sleeve 112 to accommodate the ball nut 64. A presently preferred embodiment of the ball nut 64 is commercially available from Thomson-Saginow (www.thomsonind.com) as Catalog Part No. 5704271.

As shown particularly in FIGS. 5 and 6, the ball nut 64 is coupled by a gear belt 116 to the positioning motor 66 mounted by a pivot mount 118 to an upper arm 120 of the retainer block 96. The positioning motor 66 is mounted by the pivot mount 118 on a tension plate 122 and a tension adjustment mechanism 124 allows for the accurate positioning of the positioning motor 66 and tension plate 122 on the retainer block 96. Appropriate tension on the gear belt 116 coupled to the output shaft of the positioning motor 66 is maintained by the tension adjustment mechanism 124. The orientation of the positioning motor 66 relative to the ball nut 64 on the retainer block 96 according to the presently preferred embodiment of this invention is correctly shown in its relative position in FIGS. 3 and 5; however, in FIG. 6 the positioning motor 66 is shown out of position for clarity and completeness without being blocked by other components of the knife holder assembly 56.

Each positioning motor 66 of the knife holder assemblies 56 is electrically and operably coupled to the programmable logic controller 68. The programmable logic controller 68 is likewise electrically and operably coupled to the HMI interface 70 (FIG. 1). Each positioning motor 66 receives instructions from the programmable logic controller 68 according to inputs entered by the operator through the HMI interface 70 and, upon actuation, the respective positioning motors 66 rotate the gear belt 116 trained around the output of the positioning motor 66 and the ball nut 64. Rotation in the appropriate direction of the positioning motor 66 output shaft and likewise the ball nut 64 that is threadably coupled to the fixed or stationary threaded shaft 60 or 62 moves the knife holder assembly 56 relative to the threaded shaft 60 or 62 to the appropriate position. Likewise, the ball nut 64 and positioning motor 66 assembly lock the knife holder assembly 56 at the desired position during operation of the machine 10 through the torque of the motor 66.

Each drive shaft section 74 of the upper and lower drive shaft assemblies 44, 46 includes a keyway 126 projecting radially inwardly from the outer circumference of the drive shaft sections 74. The keyway 126 is sized and configured to receive a key 128 projecting radially inwardly from an arbor 130 seated within the large hole 100 in the retainer block 96. The arbor 130 is therefore coupled to the drive shaft assembly 44, 46 for rotation with the drive shaft relative to the retainer block 96. Likewise, the arbor 130 has the rotary disk-shaped knife 58 with a pair of stripper plates 132 mounted on the opposite faces of the knife 58 for rotation with the arbor 130. The stripper plates 132 and knife 58 are mounted by bolts or otherwise to the arbor 130 for rotation with the drive shaft assembly 44, 46. Ball bearings 134 are provided between sleeve 112 and retaining block 96 at the smaller upper hole 98 and bearings 140 are likewise provided between the inner surface of the larger hole 100 in the retainer block 96 and the arbor 130 as shown in FIG. 6. Spacers 138 and ball bearings 140 are included to allow for the free rotational movement of the arbor 130 relative to the knife holder assembly retainer block 96. As such, rotational input from the motor 54 through the gear box 50 and universal couplings 52 to the appropriate drive shaft assembly 44, 46 drives the arbor 130 and associated stripper plates 132 and knife 58 for slitting of the metal sheet 12.

In accordance with the principles of the present invention, the knife holder assemblies 56, arbors 130 and knives 58 are not supported by the upper and lower drive shaft assemblies 44, 46. Rather, the knife holder assemblies 56 are supported for movement along the upper and lower drive shaft assemblies 44, 46 by the upper and lower frames 26, 28 through the rails 110 and the linear bearing blocks 104. In this way, the upper and lower drive shaft assemblies are torsional members only to provide torque to the knives 58. The drive shaft assemblies 44, 46, therefore, do not take any separating load during the slitting operation since the load is transmitted from the knife holder assemblies to the upper and lower frames 28, 28.

Figure 11:
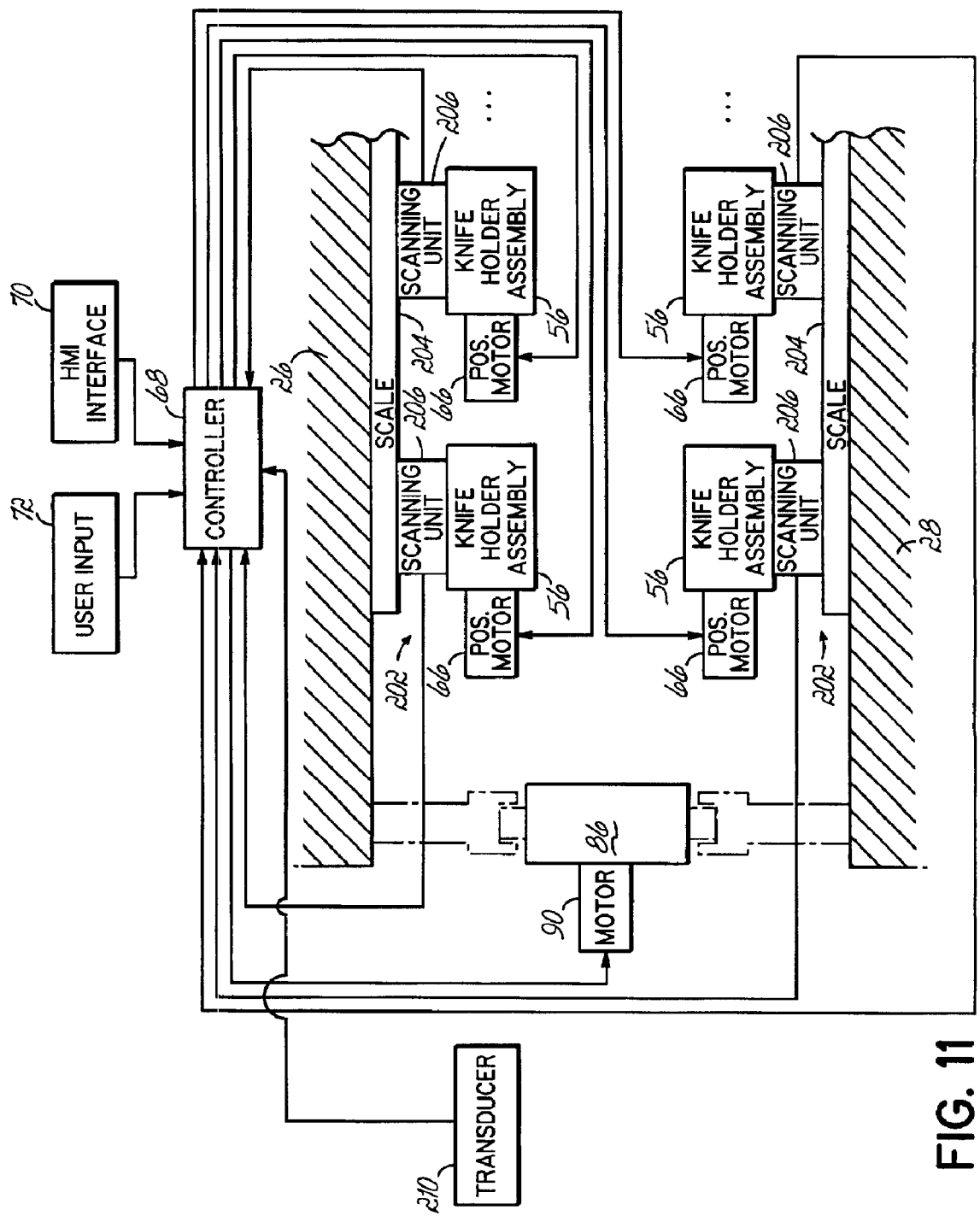
FIG. 11 is a functional block diagram of a control system according to a presently preferred embodiment of this invention.

Referring now to FIG. 11, a control system 200 of the slitting machine 10 according to a presently preferred embodiment is shown. As described in detail above, the movement of each knife holder assembly 56 along the upper and lower drive shaft assemblies 44, 46 to a desired position is controlled through inputs applied to the positioning motors 66 from the programmable logic controller 68. The control system 200 includes a pair of upper and lower linear encoders 202 (FIGS. 3 and 12) associated with the upper and lower knife holder assemblies 56 that provide inputs to the programmable logic controller 68 to indicate the position of each knife holder assembly 56 along the respective upper and lower drive shaft assemblies 44, 46. Each linear encoder 202 includes an elongated scale 204 that is supported by the upper and lower frames 26, 28 and scanning units 206 that are each mounted to one of the knife holder assemblies 56. The scanning units 206 are electrically coupled to the controller 68 and are operable to read the scale 208 (FIG. 3) housed within each linear encoder 202 and provide scale data to the programmable logic controller 68 so that the position of each knife holder assembly 56 is monitored and controlled by the controller 68 in a closed-loop feedback control. A suitable linear encoder 202 for use in the slitting machine 10 of the present invention is commercially available from Heidenhain Corporation of Schaumburg, Ill., although other linear encoders and other position detecting systems are possible as well.

The control system 200 of the present invention is also operable to adjust the relative vertical positioning of the upper and lower rotary knives 58. As described in detail above, pivotal movement of the upper frame 26 relative to fixed lower frame 28 is controlled through actuation of the jack screws 86 by the jack screw motor 90. To this end, the jack screw motor 90 receives an input from the programmable logic controller 68 to extend or retract the jack screws 86 according to inputs entered by the operator through the HMI interface 70. A transducer 210 is mounted on the slitting machine 10 and is electrically coupled to the programmable logic controller 68 to provide an input to the controller 68 that indicates the relative vertical position of upper and lower rotary knives 58. The programmable logic controller 68 uses the data generated by the transducer 210 to monitor and adjust the relative vertical positioning of the upper and lower knives 58 in a closed-loop feedback control as well.

Referring now to FIG. 12, a main "KNIFE POSITIONING ROUTINE" 300 is shown that is performed by the control system 200 of the present invention to control positioning of the upper and lower knife holder assemblies 56 along the upper and lower drive shaft assemblies 44, 46 and to adjust the relative vertical positioning of upper and lower knives 58 in accordance with the principles of the present invention. As will be described in greater detail below, "KNIFE POSITIONING ROUTINE" 300 generally includes five (5) routines, including the "ENTER VALUES ROUTINE" 302, "AUTO START ROUTINE" 304, "PERMISSIVE CHECK ROUTINE" 320, "POSITION KNIVES ROUTINE" 306 and "KNIFE POSITION CHECK ROUTINE" 308, that are performed by the programmable logic controller 68 or the HMI interface 70 to enable the slitting machine 10 to set up the machine automatically according to data input by a user through the HMI interface 70.

More specifically, and referring to FIG. 13, an "ENTER VALUES ROUTINE" 302 is initially performed by controller 68 and HMI interface 70 that prompts the user at step 310 to input data or values through the HMI interface 70. These values include the number of desired mults 14, the desired width of each mult 14, the material thickness of sheet 12, the desired percentage of horizontal gap between cooperating upper and lower knives 58, the desired relative vertical position of the upper and lower rotary knives 58 and the desired offset distance from centerline, although other inputs are possible as well without departing from the spirit and scope of the present invention. At step 312, the HMI interface 70 determines whether these input values are within acceptable size limits previously defined and stored in the HMI interface 70. If the values input by the user are acceptable, the input values received at step 310 are then stored in the programmable logic controller 68 at step 314. Otherwise, an error message is displayed at step 316 to alert the operator that one or more of the entered values are out of the acceptable range. The user is then prompted at step 310 to continue inputting data through the HMI interface 70 that is within the acceptable range.

After the acceptable values are received and stored in the programmable logic controller 68 from the "ENTER VALUES ROUTINE" 302, the controller 68 executes an "AUTO START ROUTINE" 304 that enables the slitting machine 10 to automatically position the knife holder assemblies 56 according to the data input by the user during the "ENTER VALUES ROUTINE" 302. The "AUTO START ROUTINE" 304 is shown in FIG. 14 and includes a step 318 at which the programmable logic controller 68 determines whether an "Auto Start" push button (not shown) has been turned on or actuated by the user. The "Auto Start" push button is a user actuatable button located at the user interface 72 of the machine 10 that enables the slitting machine to automatically set itself up according to the data input by the user at step 310 when the "Auto Start" push button is enabled. If the "Auto Start" push button is enabled, the "AUTO START ROUTINE" 304 performs a "PERMISSIVE CHECK ROUTINE" at step 320 that checks various conditions of the slitting machine 10 to insure that the machine 10 is operating properly. The "PERMISSIVE CHECK ROUTINE" 320 is performed continuously during execution of the main "KNIFE POSITION ROUTINE" 300 of FIG. 1 and will be described in detail below in connection with FIG. 15. Otherwise, if the "Auto Start" push button is not enabled as determined at step 318, control passes back to the "ENTER VALUES ROUTINE" 302 of FIG. 13.

If the "PERMISSIVE CHECK ROUTINE" 320 passes, indicating that the machine 10 is operating properly, the programmable logic controller 68 enables the "Auto Start" capability of the slitting machine 10 and turns on the "Auto Light" (not shown) located at the user interface 72 at step 322. If the "PERMISSIVE CHECK ROUTINE" 320 fails, indicating that the machine 10 is not operating properly, the programmable logic controller 68 disables the "Auto Start" capability of the slitting machine 10 and turns off the "Auto Light" at step 324 and control passes back to the "ENTER VALUES ROUTINE" 302 of FIG. 13.

Figures 15, 16:
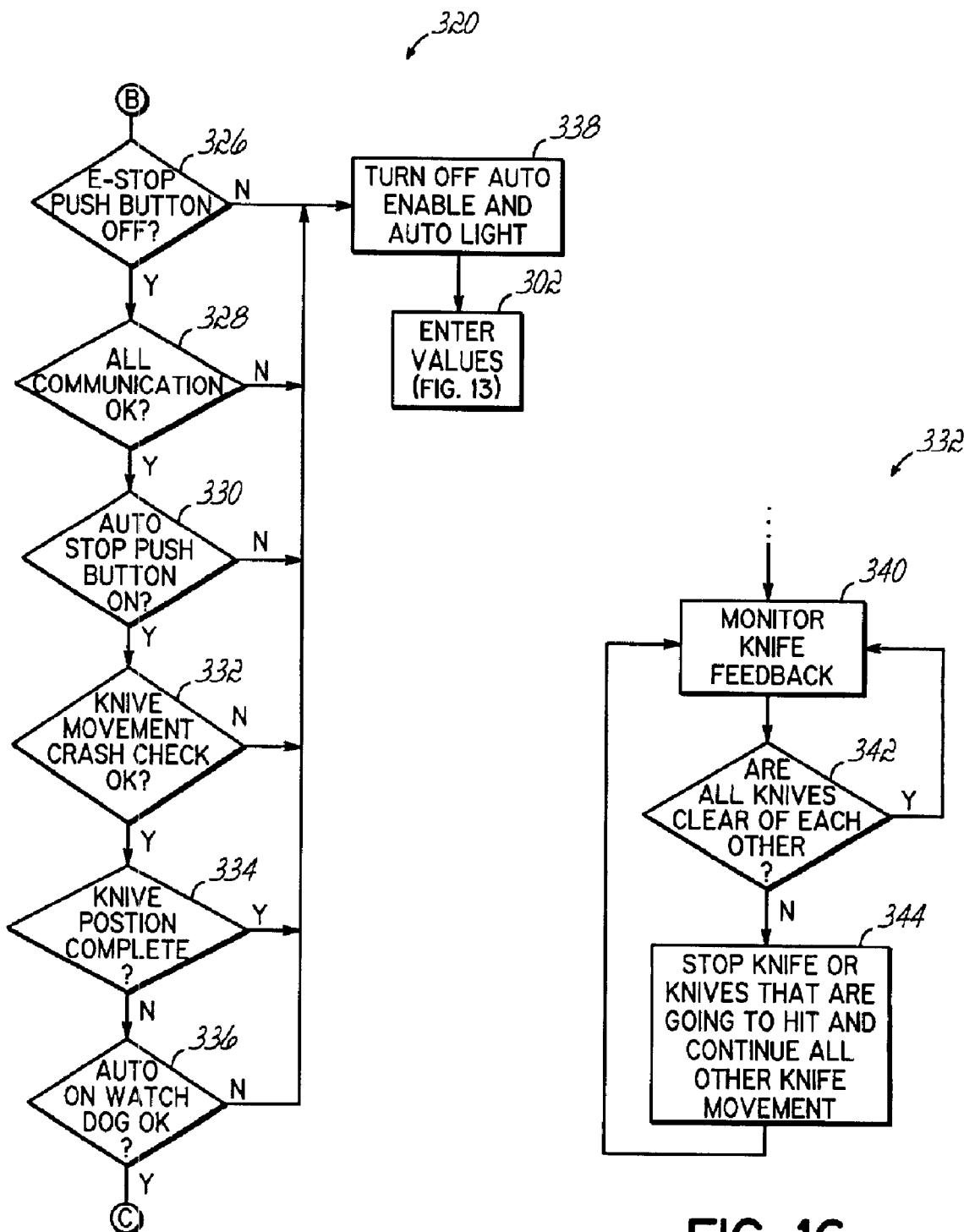

Referring now to FIG. 15, the "PERMISSIVE CHECK ROUTINE" 320 performed continuously by the programmable logic controller 68 will now be described. The "PERMISSIVE CHECK ROUTINE" 320 performs various system checks at steps 326–336 to determine whether the slitting machine 10 is operating properly. In particular, the controller 68 determines at step 326 whether an "Emergency Stop" or "E-Stop" button (not shown) has been turned on or actuated by the user. The "E-Stop" push button is a user actuatable button located at the machine 10 that immediately stops all operation of the slitting machine 10 when the "E-Stop" push button is enabled, such as during an emergency. If the "E-Stop" push button is not enabled, the controller 68 performs a check at step 328 to determine if all communication systems of the slitting machine 10 are functioning properly. At step 330, the programmable logic controller 68 determines whether an "Auto Stop" push button (not shown) has been turned on or actuated by the user. The "Auto Stop" push button is a user actuatable button located at the user interface 72 that disables the "Auto Start" operation of the slitting machine 10 and turns off the "Auto Light" when the "Auto Stop" push button is enabled.

Further referring to FIG. 15, the programmable logic controller 68 performs a "KNIFE MOVEMENT CRASH ROUTINE" at step 332 to determine whether movement of the knife holder assemblies 56 will cause any two or more of them to hit into each other, thereby possibly damaging the slitting machine 10. The "KNIFE MOVEMENT CRASH ROUTINE" 332 will be described in detail below in connection with FIG. 16. At step 334, the programmable logic controller 68 determines whether the knives have moved to their desired positions along the upper and lower drive assemblies 44, 46 so that movement of the knives is complete. At the last step 336 of the "PERMISSIVE CHECK ROUTINE" 320, the programmable logic controller 68 performs a "AUTO ON WATCH DOG ROUTINE" to determine whether the control system 200 is operating properly. The "AUTO ON WATCH DOG ROUTINE" 336 will be described in detail below in connection with FIG. 17. Failure of any one of the permissive checks performed at steps 326–336 causes the programmable logic controller 68 to disable the "Auto Start" capability of the slitting machine 10 and turn off the "Auto Light" at step 338 and control passes back to the "ENTER VALUES ROUTINE" 302 of FIG. 13.

Referring now to FIG. 16, the "KNIFE MOVEMENT CRASH ROUTINE" 332 performed by the programmable logic controller 68 will now be described. At step 340, the programmable logic controller 68 monitors the movement and position of each knife holder assembly 56 through the scale data provided by the scanning units 206 of the linear encoders 202. At step 342, the programmable logic controller 68 determines whether movement of the knife holder assemblies 56 to the values entered at step 310 will cause any two or more of them to hit into each other. If this is the case, the programmable logic controller 68 at step 344 stops movement of all knife holder assemblies 56 that are going to hit each other while permitting all other knife holder assemblies 56 to continue movement to their desired positions. If all knife holder assemblies 56 are clear of each other as determined at step 342, control passes back to step 340.

Figure 17:
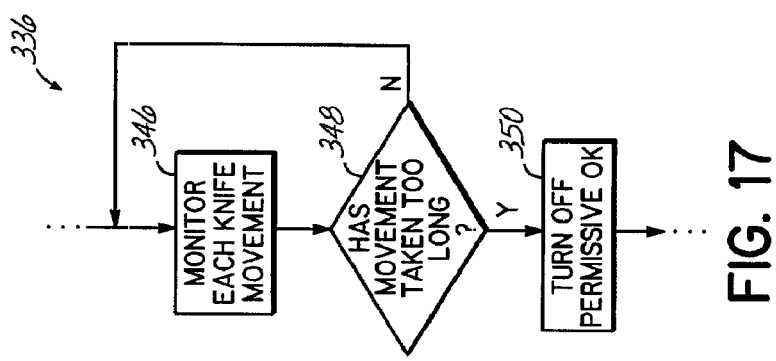

Referring now to FIG. 17, the "AUTO ON WATCH DOG ROUTINE" 336 performed by the programmable logic controller 68 will now be described. At step 346, the controller 68 monitors the movement and position of each knife holder assembly 56 through the scale data provided by the scanning units 206 of the linear encoders 202. At step 348, the controller 68 determines whether each knife holder assembly 56 has reached its desired position within a predetermined period of time stored in the controller 68. If any one of the knife holder assemblies 56 does not reach its desired position within the predetermined period of time as determined at step 348, the controller 68 indicates that the permissive check has failed at step 350 and control passes back to step 338 as described in detail above.

Figure 18:
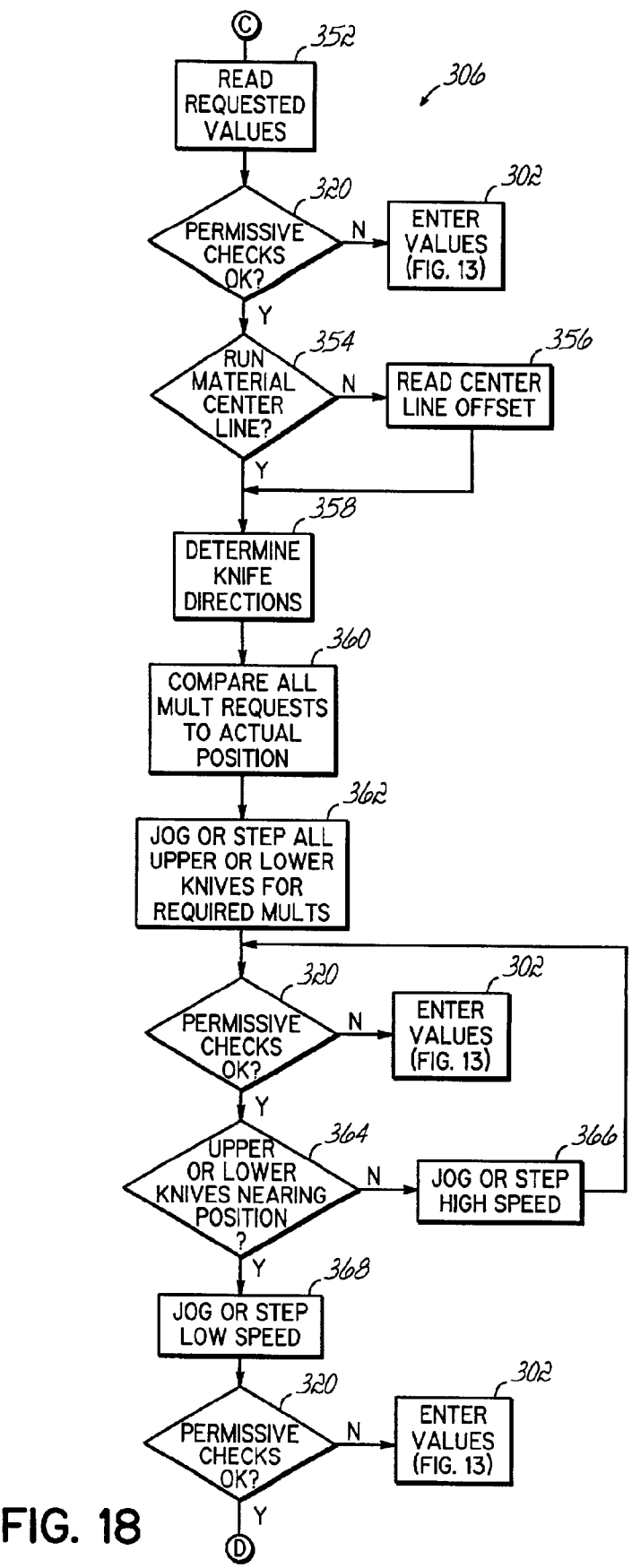

Referring now to FIG. 18, a "POSITION KNIVES ROUTINE" 306 performed by the programmable logic controller 68 during the main "KNIFE POSITIONING ROUTINE" 300 of FIG. 12 will now be described. The "POSITION KNIVES ROUTINE" 306 is responsible for moving the knife holder assemblies 56 to their desired positions according to the data input by the user at step 310. At step 352, the controller 68 reads the values input by the user at step 310 and stored at step 314 of the "ENTER VALUES ROUTINE" 302 (FIG. 13). At step 320, the controller 68 performs the "PERMISSIVE CHECK ROUTINE" described in connection with FIG. 15. If the "PERMISSIVE CHECK ROUTINE" 320 passes, the controller 68 determines at step 354 whether the user has chosen to run the sheet 12 along the centerline of the slitting machine 10. If the user entered an offset value during step 310, the controller 68 reads the desired offset distance from the machine centerline at step 356. At steps 358 and 360, the controller 68 determines the necessary movement direction of the knife holder assemblies 56 and also compares all mult requests entered by the user at step 310 with the actual positions of the knife holder assemblies 56 as determined by the control system 200.

Further referring to FIG. 18, at step 362 the controller 68 jogs or steps all upper and lower knife holder assemblies 56 along the upper and lower drive shaft assemblies 44, 46 at a generally rapid speed toward their desired positions. At step 320, the controller 68 again performs the "PERMISSIVE CHECK ROUTINE" described in connection with FIG. 15. If the "PERMISSIVE CHECK ROUTINE" 320 passes, the controller 68 determines at step 364 if the upper and lower knife holder assemblies 56 are nearing their desired positions along the upper and lower drive shaft assemblies 44, 46. If not, the controller 68 continues at step 366 to jog or step the upper and lower knife holder assemblies 56 toward their desired positions at the generally rapid speed and control passes back to the "PERMISSIVE CHECK ROUTINE" 320. If the controller 68 determines at step 364 that one or more of the knife holder assemblies 56 are nearing their desired positions along the upper and lower drive shaft assemblies 44, 46, the controller 68 at step 368 jogs or steps those knife holder assemblies 56 nearing their desired positions at a lower speed to insure extremely accurate movement of the knife holder assemblies 56 to their desired positions. At step 320, the controller 68 again performs the "PERMISSIVE CHECK ROUTINE" described in connection with FIG. 15. If the "PERMISSIVE CHECK ROUTINE" 320 fails at any time during execution of the "POSITION KNIVES ROUTINE" 306, the controller 68 disables the "Auto Start" capability of the slitting machine 10 and turns off the "Auto Light" at step 338 (FIG. 15) and control passes back to the "ENTER VALUES ROUTINE" 302 of FIG. 13. In this way, the control system 200 rapidly, accurately and safely moves the knife holder assemblies 56 to their desired positions along the upper and lower drive shaft assemblies 44, 46.

Figure 19:
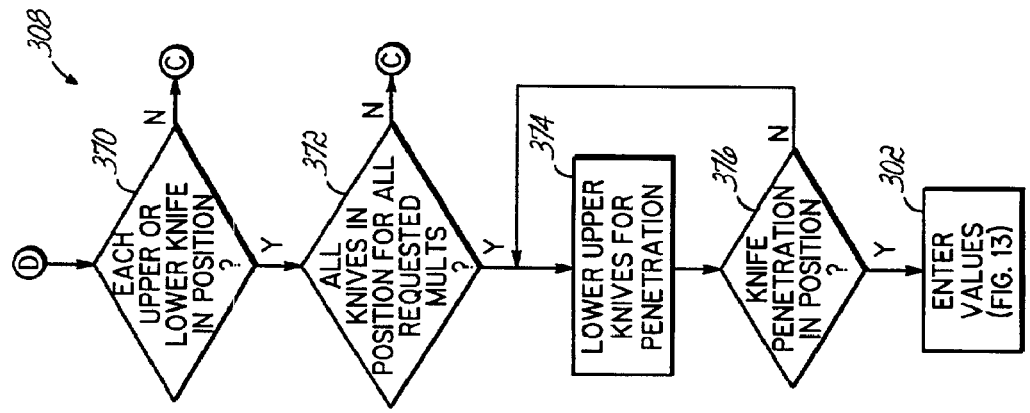

Referring now to FIG. 19, a "KNIFE POSITION CHECK ROUTINE" 308 performed by the programmable logic controller 68 during the main "KNIFE POSITIONING ROUTINE" 300 of FIG. 12 will now be described. At step 370, the controller 68 determines whether each upper and lower knife holder assembly 56 has reached its desired position along the upper and lower drive shaft assemblies 44, 46. If not, control passes back to the "POSITION KNIVES ROUTINE" 306 of FIG. 18 so that each remaining knife holder assembly 56 is moved to its desired position as described in detail above in connection with the "POSITION KNIVES ROUTINE" 306 of FIG. 18. At step 372, the controller 68 determines if all knife holder assemblies 56 have reached their desired positions for the desired mults 14 entered by the user at step 310. If not, control again passes back to the "POSITION KNIVES ROUTINE" 306 of FIG. 18 so that each remaining knife holder assembly 56 is moved to its desired position for the desired mults 14 as described in detail above in connection with the "POSITION KNIVES ROUTINE" 306 of FIG. 18.

Further referring to FIG. 19, if all knife holder assemblies 56 are properly positioned along the upper and lower drive shaft assemblies 56 for the desired mults 14 entered by the user at step 310, the controller 68 at step 374 actuates the jack screw motor 90 to set the desired relative vertical position of the upper and lower knives 58 according to the vertical knife position data input by the user at step 310. At step 376, the controller 68 monitors movement of the jack screws 86 through the data generated by the transducer 210 (FIG. 11) and determines if the desired relative vertical knife position of the upper and lower knives 58 has been achieved. If not, control passes back to step 374 so that the controller 68 actuates the jack screw motor 90 to set the desired relative vertical position of the upper and lower knives 58 according to the vertical knife position data input by the user at step 310. When the desired relative vertical knife position of the upper and lower knives 58 is achieved, control passes back to step 310 of the "ENTER VALUES ROUTINE" 302 of FIG. 13.

Accordingly, through execution of the main "KNIFE POSITIONING ROUTINE" 300 of FIG. 12 by the programmable logic controller 68, the knife holder assemblies 56 can be accurately, efficiently and safely positioned in the respective upper and lower machine frames 26, 28 by a user inputting appropriate data through the HMI interface 70. The input data includes the number of desired mults 14, the desired width of each mult 14, the material thickness of sheet 12, the desired percentage of horizontal gap between cooperating upper and lower knives 58, the desired relative vertical position of the upper and lower knives 58 and the desired offset distance from centerline, although other inputs are possible as well without departing from the spirit and scope of the present invention. This information is then processed in the programmable logic controller 68 which sends appropriate instructions to each of the positioning motors 66 to cause rotation of the respective ball nuts 64 and thereby position the knife holder assemblies 56 along the drive shaft assemblies 44, 46 as appropriate. The programmable logic controller 68 also actuates the jack screw motor 90 to achieve the desired relative vertical position of the upper and lower knives 58. Manual manipulation, dismantling and extended downtime of the slitting machine 10 is avoided with the CNC slitting machine 10 according to this invention.

From the above disclosure of the general principles of the present invention and the preceding detailed description of at least one preferred embodiment, those skilled in the art will readily comprehend the various modifications to which this invention is susceptible. Therefore, we desire to be limited only by the scope of the following claims and equivalents thereof.

What is claimed is:

1. A machine for slitting a metal sheet comprising:
   a frame;
   an upper drive shaft assembly mounted for rotation in the frame;
   a lower drive shaft assembly mounted for rotation in the frame;
   each of the drive shaft assemblies comprising a plurality of drive shaft sections each being coupled through a coupling mechanism to an adjacent drive shaft section for rotation in the frame, each coupling mechanism being mounted to rotate with the plurality of coupled drive shaft sections;
   a drive motor operably coupled to the upper and the lower drive shaft assemblies for rotation of the drive shaft assemblies;
   a plurality of knife holder assemblies supported by the frame in pairs for movement along the drive shaft assemblies such that a first knife holder assembly is supported for movement along the upper drive shaft assembly and a second knife holder assembly is supported for movement along the lower drive shaft assembly; and a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

wherein the adjacent drive shaft sections of each drive shaft assembly are adapted to be selectively repositioned relative to one another for servicing the machine.

2. The machine of claim 1 wherein:

the coupling mechanism releasably couples the adjacent drive shaft sections together.

3. The machine of claim 2 wherein the coupling mechanism is a coupling, each drive shaft section further comprising:

a spindle projecting axially from the drive shaft section, the coupling releasably connecting the spindles on adjacent drive shaft sections.

4. The machine of claim 1 further comprising:

a drive shaft uncoupling mechanism for a user to selectively uncouple the adjacent drive shaft sections.

5. The machine of claim 4 wherein the drive shaft uncoupling mechanism further comprises:

a screw operably coupled to at least one of the drive shaft sections;

whereupon rotation of the screw axially withdraws the drive shaft section from the adjacent drive shaft section.

6. The machine of claim 1 wherein the adjacent drive shaft sections are uncoupled from one another for servicing of one of the knife holder assemblies positioned proximate a juncture of the adjacent drive shaft sections.

7. A machine for slitting a metal sheet comprising:

a frame;

an upper drive shaft assembly mounted for rotation in the frame;

a lower drive shaft assembly mounted for rotation in the frame;

each of the upper and lower drive shaft assemblies comprising a plurality of drive shaft sections each being coupled through a coupling mechanism to an adjacent drive shaft section for rotation in the frame, each coupling mechanism being mounted to rotate with the plurality of coupled drive shaft sections;

a drive motor operably coupled to the upper and the lower drive shaft assemblies for rotation of the drive shaft assemblies;

inner and outer pairs of upper rail supports;

inner and outer pairs of lower rail supports;

a plurality of knife holder assemblies supported by the frame in pairs for movement along the drive shaft assemblies such that a first knife holder assembly is supported by one pair of the inner and outer pairs of upper rail supports for movement along the upper drive shaft assembly and being nestable with an adjacent first knife holder assembly and a second knife holder assembly is supported by one pair of the inner and outer pairs of lower rail supports for movement along the lower drive shaft assembly and being nestable with an adjacent second knife holder assembly;

a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

a knife holder position adjustment system operably coupled to each of the knife holder assemblies for movement of the knife holder assembly along the respective drive shaft assembly; and a programmable controller operably coupled to the knife holder position adjustment system to position the knife holder assemblies along the respective drive shaft assemblies.

8. The machine of claim 7 wherein the frame further comprises:

an upper frame in which the upper drive shaft assembly is rotatably mounted; and a lower frame coupled to the upper frame and in which the lower drive shaft assembly is rotatably mounted.

9. The machine of claim 7 wherein the knife holder position adjustment system further comprises:

an upper threaded shaft mounted in the frame; and a lower threaded shaft mounted in the frame;

wherein each of the knife holder assemblies are threadably coupled to one of the threaded shafts such that rotation of at least a portion of each knife holder assembly relative to the associated threaded shaft moves the knife holder assembly along the associated drive shaft assembly.

10. The machine of claim 9 wherein the knife holder position adjustment system further comprises:

a plurality of positioning motors each being mounted to one of the knife holder assemblies and operably coupled to the programmable controller, and a plurality of ball nuts each being mounted to one of the knife holder assemblies, threadably coupled to one of the threaded shafts and operatively coupled to the associated positioning motor, wherein actuation of each positioning motor by the programmable controller rotates the associated ball nut for movement of the associated knife holder assembly along the associated drive shaft assembly.

11. The machine of claim 7 wherein a position of each of the knife holder assemblies is adjustable by the knife holder position adjustment system independent from each of the other knife holder assemblies.

12. A machine for slitting a metal sheet comprising:

an upper frame;

a lower frame coupled to the upper frame;

an upper drive shaft assembly mounted for rotation in the upper frame, said upper drive shaft assembly comprising a plurality of upper drive shaft sections each being coupled through an upper coupling mechanism to an adjacent upper drive shaft section for rotation in the frame, each upper coupling mechanism being mounted to rotate with the plurality of coupled upper drive shaft sections;

a lower drive shaft assembly mounted for rotation in the lower frame, said lower drive shaft assembly comprising a plurality of lower drive shaft sections each being coupled through a lower coupling mechanism to an adjacent lower drive shaft section for rotation in the frame, each lower coupling mechanism being mounted to rotate with the plurality of coupled lower drive shaft sections;

a drive motor operably coupled to the upper and the lower drive shaft assemblies for rotation of the drive shaft assemblies;

a plurality of knife holder assemblies supported by the upper and lower frames in pairs for movement along the drive shaft assemblies such that a first knife holder assembly is supported for movement along the upper drive shaft assembly and a second knife holder assembly is supported for movement along the lower drive shaft assembly; and a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

wherein the upper frame is pivotally coupled to the lower frame through a pivot shaft to adjust relative vertical positioning of the knives of the first and second knife holder assemblies for slitting metal sheets of differing thicknesses.

13. The machine of claim 12 further comprising:
a frame adjustment mechanism for adjusting relative vertical positioning of the knives of the first and second knife holder assemblies in a direction generally perpendicular to the axes of the drive shaft assemblies.

14. The machine of claim 13 wherein the frame adjustment mechanism further comprises:
a pair of jack screws each mounted between the upper and lower frames.

15. The machine of claim 14 further comprising:
an actuator coupled to each of the jack screws for simultaneous adjustment of the jack screws.

16. The machine of claim 12 wherein movement of the upper frame relative to the lower frame maintains the frames generally parallel relative to each other.

17. The machine of claim 16 wherein the pivot shaft is offset from each of the upper and lower drive shaft assemblies.

18. A machine for slitting a metal sheet comprising:
an upper frame;
a lower frame coupled to the upper frame;
an upper drive shaft assembly mounted for rotation in the upper frame, said upper drive shaft assembly comprising a plurality of upper drive shaft sections each being coupled through an upper coupling mechanism to an adjacent upper drive shaft section for rotation in the frame, each upper coupling mechanism being mounted to rotate with the plurality of coupled upper drive shaft sections;
a lower drive shaft assembly mounted for rotation in the lower frame, said lower drive shaft assembly comprising a plurality of lower drive shaft sections each being coupled through a lower coupling mechanism to an adjacent lower drive shaft section for rotation in the frame, each lower coupling mechanism being mounted to rotate with the plurality of coupled lower drive shaft sections;

a drive motor operably coupled to the upper and the lower drive shaft assemblies for rotation of the drive shaft assemblies;
inner and outer pairs of upper rail supports;
inner and outer pairs of lower rail supports;
a plurality of knife holder assemblies supported by the upper and lower frames in pairs for movement along the drive shaft assemblies such that a first knife holder assembly is supported by one pair of the inner and outer pairs of upper rail supports for movement along the upper drive shaft assembly and being nestable with an adjacent first knife holder assembly and a second knife holder assembly is supported by one pair of the inner and outer pairs of lower rail supports for movement along the lower drive shaft assembly and being nestable with an adjacent second knife holder assembly;
a plurality of rotary knives each being mounted in one of the knife holder assemblies and driven by one of the upper and lower drive shaft assemblies;
wherein the knives of the first and second knife holder assemblies cooperate to slit the metal sheet passing through a nip between the knives of the respective knife bolder assemblies;
a plurality of positioning motors each being mounted to one of the knife holder assemblies;
an upper threaded shaft mounted in the upper frame;
a lower threaded shaft mounted in the lower frame;
a plurality of ball nuts each being mounted to one of the knife holder assemblies, threadably coupled to one of the threaded shafts and operatively coupled to the associated positioning motor;
wherein rotation of at least a portion of each ball nut relative to the associated threaded shaft moves the knife holder assembly along the associated drive shaft assembly;
a programmable controller operably coupled to each of the positioning motors to position the knife holder assemblies along the respective drive shaft assemblies;
wherein actuation of each positioning motor by the programmable controller rotates the associated ball nut for movement of the associated knife holder assembly along the associated drive shaft assembly; and
wherein a position of each of the knife holder assemblies is adjustable independent from each of the other knife holder assemblies.

19. A machine for slitting a metal sheet comprising:
a frame;
an upper drive shaft assembly mounted for rotation in the frame;
a lower drive shaft assembly mounted for rotation in the frame;
each of the drive shaft assemblies comprising a plurality of drive shaft sections each being releasably coupled to an adjacent drive shaft section for rotation in the frame;
a spindle projecting axially from each of the drive shaft sections;
a coupling releasably connecting the spindles on adjacent drive shaft sections together each coupling being mounted to rotate with the drive shaft sections;
a drive motor operably coupled to the upper and the lower drive shaft assemblies for rotation of the drive shaft assemblies;
a plurality of knife holder assemblies supported by the frame in pairs for movement along the drive shaft assemblies such that a first knife holder assembly is supported for movement along the upper drive shaft assembly and a second knife holder assembly is supported for movement along the lower drive shaft assembly;

a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

wherein the adjacent drive shaft sections of each drive shaft assembly are adapted to be selectively uncoupled from one another for servicing of one of the knife holder assemblies positioned proximate a juncture of the adjacent drive shaft sections; and a screw operably coupled to at least one of the drive shaft sections;

whereupon rotation of the screw axially withdraws the drive shaft section from the adjacent drive shaft section.

20. A machine for slitting a metal sheet comprising:

a frame;

an upper drive shaft assembly mounted for rotation in the frame;

a lower drive shaft assembly mounted for rotation in the frame;

each of the drive shaft assemblies comprising a plurality of drive shaft sections each being releasably coupled to an adjacent drive shaft section for rotation in the frame;

a coupling mounted to releasably couple the adjacent drive shafts together and rotate with the drive shaft sections;

wherein the adjacent drive shaft sections of each drive shaft assembly are adapted to be selectively uncoupled from one another for servicing the machine;

a drive motor operably coupled to the upper and the lower drive shaft assemblies for rotation of the drive shaft assemblies;

a plurality of knife holder assemblies supported by the frame in pairs for movement along the drive shaft assemblies such that a first knife holder assembly is supported for movement along the upper drive shaft assembly and a second knife holder assembly is supported for movement along the lower drive shaft assembly;

a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

a knife holder position adjustment system operably coupled to each of the knife holder assemblies for movement of the knife holder assembly along the respective drive shaft assembly; and a programmable controller operably coupled to the knife holder position adjustment system to position the knife holder assemblies along the respective drive shaft assemblies.

21. A machine for slitting a metal sheet comprising:

an upper frame;

a lower frame pivotally coupled to the upper frame through a pivot shaft;

an upper drive shaft assembly mounted for rotation in the upper frame, said upper drive shaft assembly comprising a plurality of upper drive shaft sections each being coupled through an upper coupling mechanism to an adjacent upper drive shaft section for rotation in the frame, each upper coupling mechanism being mounted to rotate with the plurality of coupled upper drive shaft sections;

a lower drive shaft assembly mounted for rotation in the lower frame, said lower drive shaft assembly comprising a plurality of lower drive shaft sections each being coupled through a lower coupling mechanism to an adjacent lower drive shaft section for rotation in the frame, each lower coupling mechanism being mounted to rotate with the plurality of coupled lower drive shaft sections;

a drive motor operably coupled to the upper and the lower drive shaft assemblies for rotation of the drive shaft assemblies;

a plurality of knife holder assemblies supported by the upper and lower frames in pairs on the drive shaft assemblies such that a first knife holder assembly is supported for movement along the upper drive shaft assembly and a second knife holder assembly is supported for movement along the lower drive shaft assembly; and a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

a pair of jack screws each mounted between the upper and lower frames for adjusting relative vertical positioning of the knives of the first and second knife holder assemblies in a direction generally perpendicular to the axes of the drive shaft assemblies for slitting metal sheets of differing thicknesses;

wherein movement of the upper frame relative to the lower frame maintains the frames generally parallel relative to each other; and an actuator coupled to each of the jack screws for simultaneous adjustment of the jack screws.

22. A machine for slitting a metal sheet comprising:

an upper frame;

a lower frame coupled to the upper frame;

an upper drive shaft assembly mounted for rotation in the upper frame, said upper drive shaft assembly comprising a plurality of upper drive shaft sections each being coupled through an upper coupling mechanism to an adjacent upper drive shaft section for rotation in the frame, each upper coupling mechanism being mounted to rotate with the plurality of coupled upper drive shaft sections;

a lower drive shaft assembly mounted for rotation in the lower frame, said lower drive shaft assembly comprising a plurality of lower drive shaft sections each being coupled through a lower coupling mechanism to an adjacent lower drive shaft section for rotation in the frame, each lower coupling mechanism being mounted to rotate with the plurality of coupled lower drive shaft sections;

a drive motor operably coupled to the upper and the lower drive shaft assemblies for rotation of the drive shaft assemblies;

a plurality of knife holder assemblies supported by the upper and lower frames in pairs on the drive shaft assemblies such that a first knife holder assembly is supported for movement along the upper drive shaft assembly and a second knife holder assembly is supported for movement along the lower drive shaft assembly;

a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

a knife holder position adjustment system operably coupled to each of the knife holder assemblies for movement of the knife holder assembly along the respective drive shaft assembly; and a programmable controller operably coupled to the knife holder position adjustment system to position the knife holder assemblies along the respective drive shaft assemblies;

wherein the upper frame is pivotally coupled to the lower frame through a pivot shaft to adjust relative vertical positioning of the knives of the first and second knife holder assemblies for slitting metal sheets of differing thicknesses.

23. A machine for slitting a metal sheet comprising:

an upper frame;

a lower frame coupled to the upper frame;

an upper drive shaft assembly mounted for rotation in the upper frame;

a lower drive shaft assembly mounted for rotation in the lower frame;

each of the drive shaft assemblies comprising a plurality of drive shaft sections each being releasably coupled to an adjacent drive shaft section for rotation in the associated frame;

a coupling mounted to releasably couple the adjacent drive shaft sections together and rotate with the drive shaft sections;

a drive motor operably coupled to the upper and the lower drive shaft assemblies for rotation of the drive shaft assemblies;

a plurality of knife holder assemblies supported by the upper and lower frames in pairs supported for movement along the drive shaft assemblies such that a first knife holder assembly is supported for movement along the upper drive shaft assembly and a second knife holder assembly is supported for movement along the lower drive shaft assembly;

a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

wherein the adjacent drive shaft sections of each drive shaft assembly are adapted to be selectively uncoupled from one another for servicing the machine;

wherein the upper frame is movable relative to the lower frame to adjust relative vertical positioning of the knives of the first and second knife holder assemblies for slitting metal sheets of differing thicknesses.

24. A machine for slitting a metal sheet comprising:

an upper frame;

a lower frame coupled to the upper frame;

an upper drive shaft assembly mounted for rotation in the upper frame;

a lower drive shaft assembly mounted for rotation in the lower frame;

each of the drive shaft assemblies comprising a plurality of drive shaft sections each being releasably coupled to an adjacent drive shaft section for rotation in the respective frame;

wherein the adjacent drive shaft sections of each drive shaft assembly are adapted to be selectively uncoupled from one another for servicing the machine;

a drive motor operably coupled to the upper and the lower drive shaft assemblies for rotation of the drive shaft assemblies;

a plurality of knife holder assemblies supported by the upper and lower frames in pairs for movement along the drive shaft assemblies such that a first knife holder assembly is supported for movement along the upper drive shaft assembly and a second knife holder assembly is supported for movement along the lower drive shaft assembly;

a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

wherein the upper frame is pivotally coupled to the lower frame through a pivot shaft to adjust relative vertical positioning of the knives of the first and second drive shaft assemblies for slitting metal sheets of differing thicknesses;

a knife holder position adjustment system operably coupled to each of the knife holder assemblies for movement of the knife holder assembly along the respective drive shaft assembly; and a programmable controller operably coupled to the knife holder position adjustment system to position the knife holder assemblies along the respective drive shaft assemblies.

25. A machine for slitting a metal sheet comprising:

a frame;

an upper drive shaft assembly mounted for rotation in the frame, said upper drive shaft assembly comprising a plurality of upper drive shaft sections each being coupled through an upper coupling mechanism to an adjacent upper drive shaft section for rotation in the frame, each upper coupling mechanism being mounted to rotate with the plurality of coupled upper drive shaft sections;

a lower drive shaft assembly mounted for rotation in the frame, said lower drive shaft assembly comprising a plurality of lower drive shaft sections each being coupled through a lower coupling mechanism to an adjacent lower drive shaft section for rotation in the frame, each lower coupling mechanism being mounted to rotate with the plurality of coupled lower drive shaft sections;

a drive motor operably coupled to the upper and the lower drive shaft assemblies for rotation of the drive shaft assemblies;

inner and outer pairs of upper rail supports;

inner and outer pairs of lower rail supports;

a plurality of knife holder assemblies supported by the frame in pairs for movement along the drive shaft assemblies such that a first knife holder assembly is supported by one pair of the inner and outer pairs of upper rail supports for movement along the upper drive shaft assembly and being nestable with an adjacent first knife holder assembly and a second knife holder assembly is supported by one pair of the inner and outer pairs of lower rail supports for movement along the lower drive shaft assembly and being nestable with an adjacent second knife holder assembly;

a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

knife holder position adjustment means for moving each of the knife holder assemblies along the respective drive shaft assembly; and controller means for controlling the knife holder position adjustment means.

26. A machine for slitting a metal sheet comprising:

an upper frame;

a lower frame pivotally coupled to the upper frame through a pivot shaft;

an upper drive shaft assembly mounted for rotation in the upper frame, said upper drive shaft assembly comprising a plurality of upper drive shaft sections each being coupled through an upper coupling mechanism to an adjacent upper drive shaft section for rotation in the frame, each upper coupling mechanism being mounted to rotate with the plurality of coupled upper drive shaft sections;

a lower drive shaft assembly mounted for rotation in the lower frame, said lower drive shaft assembly comprising a plurality of lower drive shaft sections each being coupled through a lower coupling mechanism to an adjacent lower drive shaft section for rotation in the frame, each lower coupling mechanism being mounted to rotate with the plurality of coupled lower drive shaft sections;

a drive motor operably coupled to the upper and the lower drive shaft assemblies for rotation of the drive shaft assemblies;

a plurality of knife holder assemblies supported by the upper and lower frames in pairs supported for movement along the drive shaft assemblies such that a first knife holder assembly is supported for movement along the upper drive shaft assembly and a second knife holder assembly is supported for movement along the lower drive shaft assembly; and a plurality of rotary knives each being mounted in one of the knife holder assemblies and driven by one of the upper and lower drive shaft assemblies;

wherein the knives of the first and second knife holder assemblies cooperate to slit the metal sheet passing through a nip between the knives of the respective knife holder assemblies;

frame moving means for moving the upper frame relative to the lower frame to adjust a relative vertical positioning of the knives of the first and second knife holder assemblies for slitting metal sheets of differing thicknesses.

* * * * *